(12) United States Patent
Iskandar et al.

(10) Patent No.: US 11,610,076 B2
(45) Date of Patent: Mar. 21, 2023

(54) AUTOMATIC AND ADAPTIVE FAULT DETECTION AND CLASSIFICATION LIMITS

(71) Applicant: Applied Materials, Inc., Santa Clara, CA (US)

(72) Inventors: Jimmy Iskandar, Fremont, CA (US); James Robert Moyne, Canton, MI (US)

(73) Assignee: Applied Materials, Inc., Santa Clara, CA (US)

( * ) Notice: Subject to any disclaimer, the term of this patent is extended or adjusted under 35 U.S.C. 154(b) by 841 days.

(21) Appl. No.: 16/534,828

(22) Filed: Aug. 7, 2019

(65) Prior Publication Data
US 2021/0042570 A1 Feb. 11, 2021

(51) Int. Cl.
G06K 9/62 (2022.01)
G05B 23/02 (2006.01)
G06F 11/34 (2006.01)
G06F 11/30 (2006.01)
G06N 20/00 (2019.01)

(52) U.S. Cl.
CPC ....... *G06K 9/6227* (2013.01); *G05B 23/0294* (2013.01); *G06F 11/3075* (2013.01); *G06F 11/3495* (2013.01); *G06K 9/6228* (2013.01); *G06K 9/6256* (2013.01); *G06N 20/00* (2019.01)

(58) Field of Classification Search
CPC .................................................... G06N 20/00
USPC ..................................... 706/12; 702/150, 35
See application file for complete search history.

(56) References Cited

U.S. PATENT DOCUMENTS

| | | | |
|---|---|---|---|
| 2012/0184840 A1* | 7/2012 | Najarian | G06K 9/629 600/407 |
| 2015/0039117 A1* | 2/2015 | Park | G05B 23/0221 700/109 |
| 2019/0042745 A1* | 2/2019 | Chen | G06F 21/566 |

(Continued)

OTHER PUBLICATIONS

Epifanio Bagarinao et al., "Adapting SVM Image Classifiers to CHanges in Imaging Conditions Using Incremental SVM: An Application to Car Detection" Confernce Paper Sep. 2009.

(Continued)

*Primary Examiner* — Kiet M Doan
(74) *Attorney, Agent, or Firm* — Lowenstein Sandler LLP

(57) ABSTRACT

A method includes receiving, from sensors, current trace data including current sensor values associated with producing products. The method further includes processing the current trace data to identify features of the current trace data and providing the features of the current trace data as input to a trained machine learning model that uses a hyperplane limit for product classification. The method further includes obtaining, from the trained machine learning model, outputs indicative of predictive data associated with the hyperplane limit and processing the predictive data and the hyperplane limit to determine: first products associated with a first product classification and second products associated with a second product classification based exclusively on the subset of the plurality of features; and third products associated with the first product classification or the second product classification based on an additional feature not within the subset.

19 Claims, 9 Drawing Sheets

(56) References Cited

U.S. PATENT DOCUMENTS

2019/0204838 A1* 7/2019 Haque .................. G05D 1/0285
2020/0387148 A1* 12/2020 Ghosh .................. G06K 9/6267

OTHER PUBLICATIONS

Hoi, Steven and Lyu, Michael R.. A Semi-Supervised Active Learning Framework for Image Retrieval. (2005). CVPR 2005: IEEE Computer Society Conference on Computer Vision and Pattern Recognition: Jun. 20-25, 2005, San Diego, CA. 302-309. Research Collection School Of Information Systems. Available at: https://ink.library.smu.edu.sg/sis_research/2394.

* cited by examiner

AUTOMATIC AND ADAPTIVE FAULT DETECTION AND CLASSIFICATION LIMITS

TECHNICAL FIELD

The present disclosure relates to limits, and, more particularly, fault detection and classification limits.

BACKGROUND

Products may be produced by performing one or more manufacturing processes using manufacturing equipment. For example, semiconductor manufacturing equipment may be used to produce wafers via semiconductor manufacturing processes. A first portion of the products may be normal (e.g., meet specification) and a second portion of the products may be abnormal (e.g., not meet specification). Over time, the semiconductor manufacturing equipment may have abnormalities that lead to unscheduled down time, equipment damage, and/or product loss.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In an aspect of the disclosure, a method includes receiving, from a plurality of sensors, current trace data comprising current sensor values associated with producing, by manufacturing equipment, a plurality of products. The method further includes processing the current trace data to identify a plurality of features of the current trace data and providing the plurality of features of the current trace data as input to a trained machine learning model that uses a hyperplane limit for product classification. The method further includes obtaining, from the trained machine learning model, one or more outputs indicative of predictive data associated with the hyperplane limit. A corrective action associated with the manufacturing equipment is to be performed based on the predictive data. The method further includes processing the predictive data and the hyperplane limit to determine: one or more first products associated with a first product classification based exclusively on a subset of the plurality of features; one or more second products associated with a second product classification based exclusively on the subset of the plurality of features; and one or more third products associated with the first product classification or the second product classification based on an additional feature not within the subset of the plurality of features.

In another aspect of the disclosure, a method includes receiving, from a plurality of sensors, historical trace data comprising historical sensor values associated with producing, by manufacturing equipment, a plurality of products. The method further includes processing the historical trace data to identify a plurality of features of the historical trace data and receiving product data corresponding to the plurality of products. The method further includes training a machine learning model using training data including the plurality of features of the historical trace data and the product data to generate a trained machine learning model that uses a hyperplane limit for product classification. The trained machine learning model may be capable of generating one or more outputs indicative of predictive data associated with the hyperplane limit. A corrective action associated with the manufacturing equipment is to be performed based on the predictive data. The predictive data and the hyperplane limit are indicative of: one or more first products associated with a first product classification based exclusively on a subset of the plurality of features; one or more second products associated with a second product classification based exclusively on the subset of the plurality of features; and one or more third products associated with the first product classification or the second product classification based on an additional feature not within the subset of the plurality of features.

BRIEF DESCRIPTION OF THE DRAWINGS

The present disclosure is illustrated by way of example, and not by way of limitation in the figures of the accompanying drawings.

DETAILED DESCRIPTION

Described herein are technologies directed to automatic and adaptive fault detection and classification (FDC) limits. Manufacturing equipment may be used to produce products (e.g., wafers). For example, manufacturing equipment may execute a recipe to produce wafers. Sensors associated with the manufacturing equipment may capture trace data including sensor values over time (e.g., during the execution of the recipe) during the production of the wafers. Some examples of sensor values may include temperature, pressure, voltage, current, flow, etc. Some of the products may be abnormal (e.g., not meet specification, have defects). Some of the manufacturing equipment may start to have abnormalities. In some conventional systems, univariate analysis is performed to receive sensor values from a sensor and determine if a sensor value from the sensor exceeds a set limit (e.g., a temperature exceeds a maximum temperature, a FDC limit). In other conventional systems, multivariate analysis is performed to receive sensor values from multiple sensors, input the sensor values into a set algorithm to receive an output, and determine if the output exceeds a set limit (e.g., a FDC limit). In conventional systems, FDC control charts (e.g., showing univariate or multivariate set FDC limits) may be generated. FDC control charts may be used to detect faults (e.g., in abnormal wafers, in manufacturing equipment, etc.) and to determine a cause of the faults.

In conventional systems, monitoring and maintaining many FDC control charts (e.g., tens of thousands of FDC control charts) uses a lot of manpower. In conventional systems, calculating accurate FDC limits may involve trial and error (e.g., in choosing which sensor values to use for the FDC limits) and may be time consuming. Due to aging and drift of equipment, FDC limits generated in conventional systems may become obsolete. Conventional systems may derive set limits based on normal products only (e.g., not take into account abnormal products). Conventional systems may not take into account interaction (e.g., relationships) between sensor statistics. Conventional systems may not automate against preventative maintenance (PM), set point change, or equipment constant (EC) change.

Figure 5A:
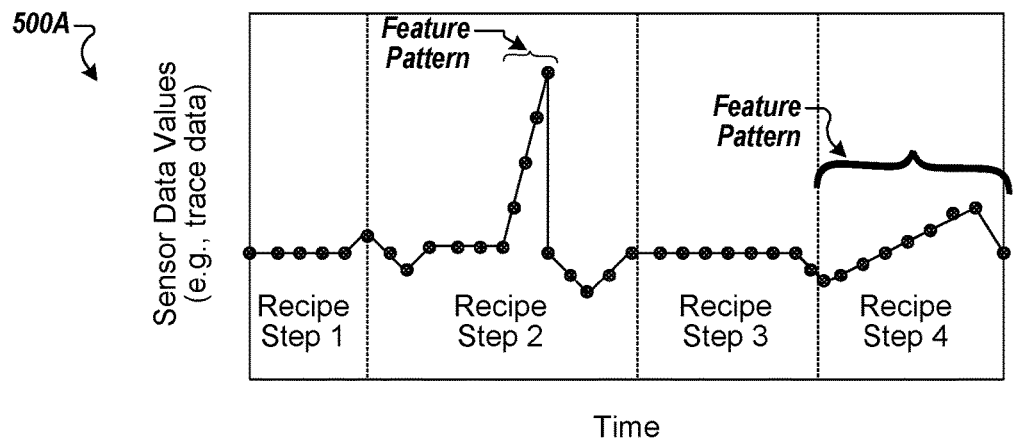
FIGS. 5A-C are plots illustrating trace data, according to certain embodiments.

The devices, systems, and methods disclosed herein provide automatic and adaptive FDC limits. A processing device may receive current trace data from sensors associated with manufacturing equipment. The current trace data may include current sensor values associated with producing, by the manufacturing equipment, products (e.g., wafers). The processing device may process the current trace data to identify features of the current trace data and may provide the features as input to a trained machine learning model. The manufacturing equipment may produce the products following a recipe to perform processes (e.g., runs) over a period of time. A recipe may include multiple processes (e.g., recipe steps). As shown in FIG. 5A, recipe steps are shown over time and the sensor data values (e.g., trace data) may have features (e.g., feature patterns) over time. The features may include one or more of sensor values from a sensor, a combination of sensor values from sensors (e.g., electric current values times voltage values), patterns (e.g., slope, peak, width, height, or the like) within sensor values, or the like. A feature may have a fixed or varying location within trace data, a feature may be found in all or some of the trace data, a feature may have fixed or varying parameters (e.g., spike with varying heights), and/or a feature may have single or multiple occurrences in trace data (e.g., a spike could be associated only with the beginning of a recipe step or may occur a varying number of times during a recipe step as the result of a static discharge).

The trained machine learning model may use a hyperplane limit for product classification. A hyperplane limit may be a boundary between classifications of products (e.g., good wafers and bad wafers) in multi-dimensional space, where each dimension corresponds to a different feature. The processing device may obtain, from the trained machine learning model, one or more outputs indicative of predictive data associated with the hyperplane limit. A corrective action associated with the manufacturing equipment may be performed based on the predictive data.

The processing device may process the predictive data and the hyperplane limit to determine: first products associated with a first product classification (e.g., normal products, good wafers) based exclusively on a subset of features (e.g., feature 1 and feature 2); second products associated with a second product classification (e.g., abnormal products, bad wafers) based exclusively on the same subset of features (e.g., feature 1 and feature 2); and third products associated with the first product classification or the second product classification based at least on an additional feature 9 e.g., feature 3) not within the subset of features. In some embodiments, the processing device generates a visual representation of an FDC limit (e.g., based on the hyperplane limit) that separates a first region corresponding to the first products, a second region corresponding to the second products, and a third region corresponding to the third products. The first region may be illustrated above an FDC limit (e.g., made of one or more lines), the second region may be below the FDC limit, and the third region (e.g., gray region) may be within the FDC limit. The processing device may predict, based on the FDC limit, one or more causes of classification within the products (e.g., causes of abnormal wafers) so that a corrective action associated with the manufacturing equipment can be performed.

Figure 6A:
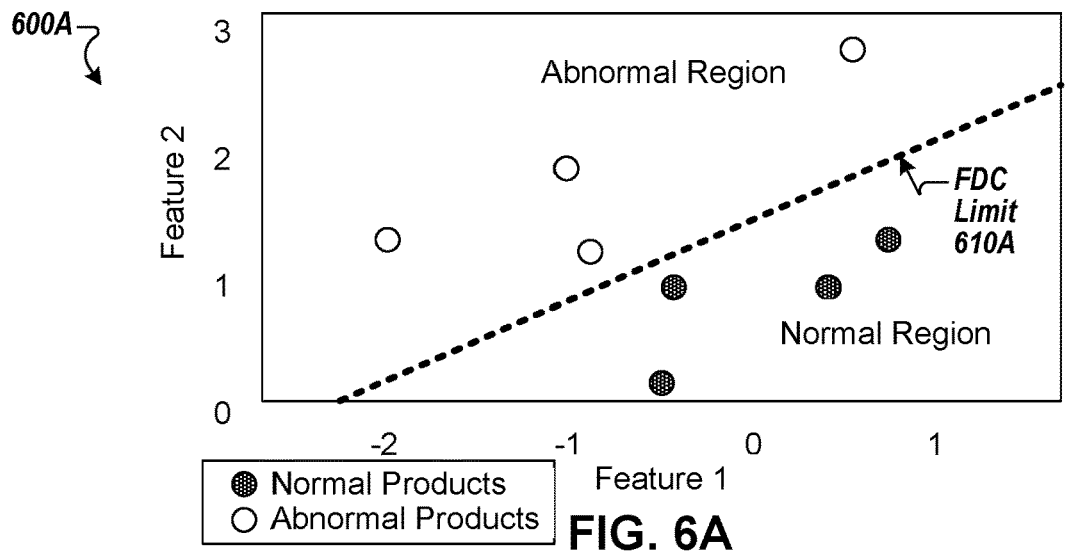
FIGS. 6A-E are plots illustrating FDC limits, according to certain embodiments.
Figure 6B:
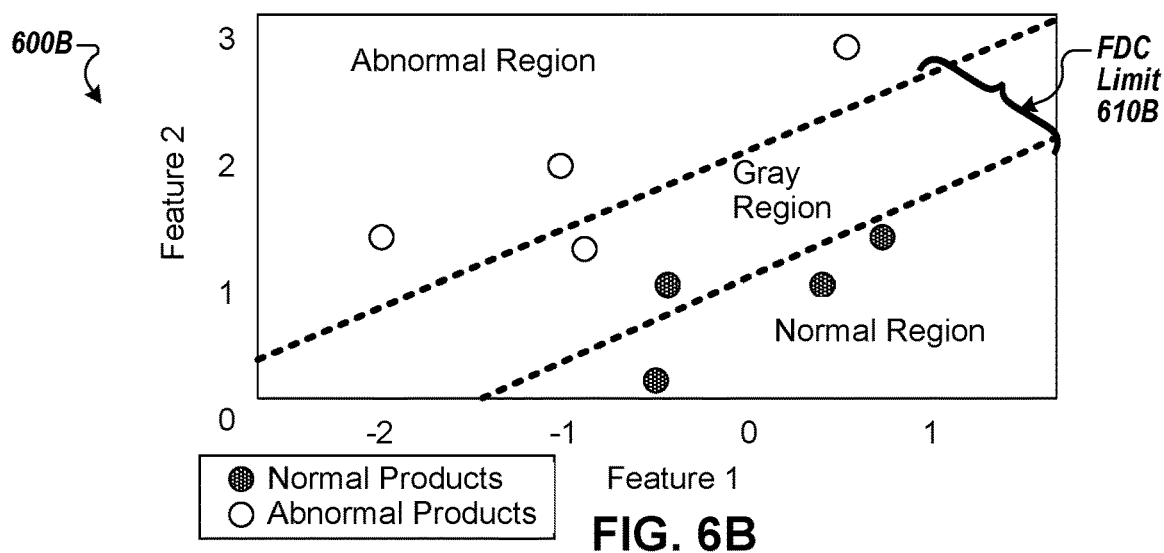
Figure 6C:
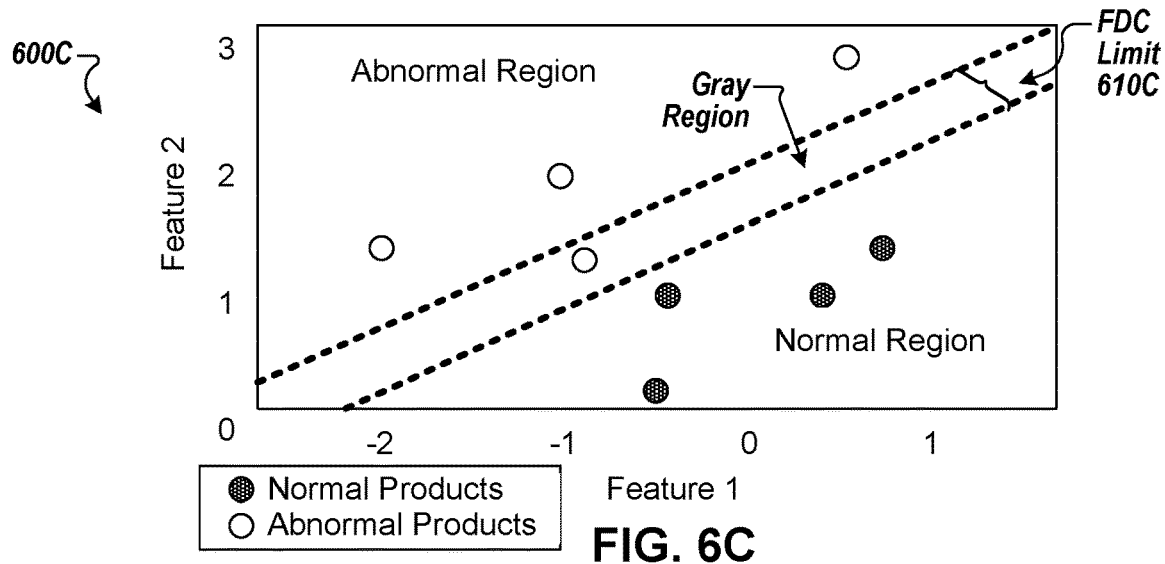

In some embodiments, the processing logic may generate (e.g., based on the predictive data, as part of the corrective action) a plot that has two axes (e.g., corresponding to two features) and different regions (e.g., normal, abnormal, and gray regions) indicated by an FDC limit (see FIGS. 6B-C). The normal region may be on a first side of the FDC limit, the abnormal region may be on a second side of the FDC limit, and the gray region may be within the FDC limit. Products corresponding to the normal region may be determined normal based on the two features shown in the axes of the plot. Products corresponding to the abnormal region may be determined abnormal based on the two features shown in the axes of the plot. Products corresponding to the gray region may be determined abnormal or normal based on at least one additional feature (e.g., in addition to or instead of the two features shown on the axes of the plot).

In some embodiments, the processing logic may generate (e.g., based on the predictive data, as part of the corrective action) a plot that defines different regions (e.g., normal, abnormal and grey regions indicated by an FDC limit) for one feature (e.g., one axis). The regions may have the same definition above, but with respect to one feature. Plotting techniques used to represent other numbers of features (e.g., greater than two features), such as spider plots, could also be used to represent normal, abnormal and gray regions.

In some embodiments, the processing logic may generate (e.g., based on the predictive data, as part of the corrective action) a plot that defines different regions (e.g., normal, abnormal, and gray regions indicated by an FDC limit) for more than two features. The plot may be one or more of a three-dimensional (3D) plot or a radar chart (e.g., a two-dimensional chart of three or more quantitative variables represented on axes starting from the same point), parallel coordinates plot (e.g., axes arranged radially), a spider plot (e.g., spider chart), web chart, star plot (e.g., star chart), cobweb chart, irregular polygon plot, polar chart, or the like.

The FDC limit may be adapted over time. For example, if manufacturing equipment has values that drift over time and do not cause abnormal products, the FDC limit may drift as the equipment drifts (e.g., see FIG. 5B). In another example, a change (e.g., preventative maintenance, set point change, equipment constant change) may adjust the values of the sensor data and the FDC limit may be adjusted accordingly (e.g., see FIG. 5C).

In some embodiments, the FDC limit may provide a partial separation based on optimization criteria (e.g., minimize false positives) or other guidance (e.g., the FDC limit may only separate a majority of normal products and abnormal products). In some embodiments, the classification is into two categories (e.g., normal and abnormal). In some embodiments, the classification is into more than two categories. For example the classification could be for good and "n" different types of bad (e.g., abnormal products with different causes). In another example, the classification could define different ratings (e.g., excellent, good, fair, and bad).

In some embodiments, a processing device may receive historical trace data from sensors associated with manufacturing equipment. The historical trace data may include historical sensor values associated with producing, by the manufacturing equipment, products. The processing device may process the historical trace data to identify features of the historical trace data and may receive product data (e.g., metrology data, etc.) corresponding to the products. The processing device may train a machine learning model using training data including the features of the historical trace data and the product data to generate a trained machine learning model that uses a hyperplane limit for product classification. The trained machine learning model may be capable of generating one or more outputs predictive data associated with the hyperplane limit (e.g., indicative of an FDC limit to identify one or more causes of classification of products associated with current trace data). A corrective action associated with the manufacturing equipment may be performed based on the predictive data.

Aspects of the present disclosure result in technological advantages of significant reduction in energy consumption (e.g., battery consumption), bandwidth used, processor overhead, and so forth. The present disclosure may result in reduction of man power to develop and maintain FDC limits. The present disclosure may result in more accurate results than conventional systems, resulting in using less energy consumption, bandwidth, and processor overhead (e.g., for error correction). The present disclosure may automatically generate FDC limits for sensor values from multiple sensors and take into account the interactions between the sensors (e.g., via training and using the machine learning model) which provides more accurate results than conventional systems that compare sensor values from a single sensor or output of a set algorithm to a set limit. The present disclosure may automatically adapt the FDC limits over time and may adjust the FDC limits due to changes in the manufacturing equipment (e.g., preventive maintenance, set point changes, equipment constant changes, etc.) instead of the conventional approaches that use set limits and result in using obsolete data. The present disclosure may provide for visualization of data and limits (e.g., FDC limits) that indicate both the univariate and multivariate level interactions between variables in determining different regions (e.g., normal products and abnormal products). The present disclosure may take into account abnormal products and normal products to provide more accurate results than conventional systems that use only normal products. Aspects of the present disclosure result in technological advantages of less defective products, less downtime of manufacturing equipment, less manpower, etc. For example, the present disclosure may predict one or more causes of abnormal products to perform a corrective action associated with the manufacturing equipment. The corrective action may lower amount of defective products, cause maintenance to be performed on the manufacturing equipment to avoid downtime and manpower associated with major corrective repairs, and the like.

It may be noted that predicting abnormal wafers and normal wafers is for purposes of illustration, rather than limitation. In some embodiments, predictions can be generated for products other than wafers and/or for equipment (e.g., abnormalities in equipment). In some embodiments, predictions can be generated for other classifications other than abnormal and normal.

Figure 1:
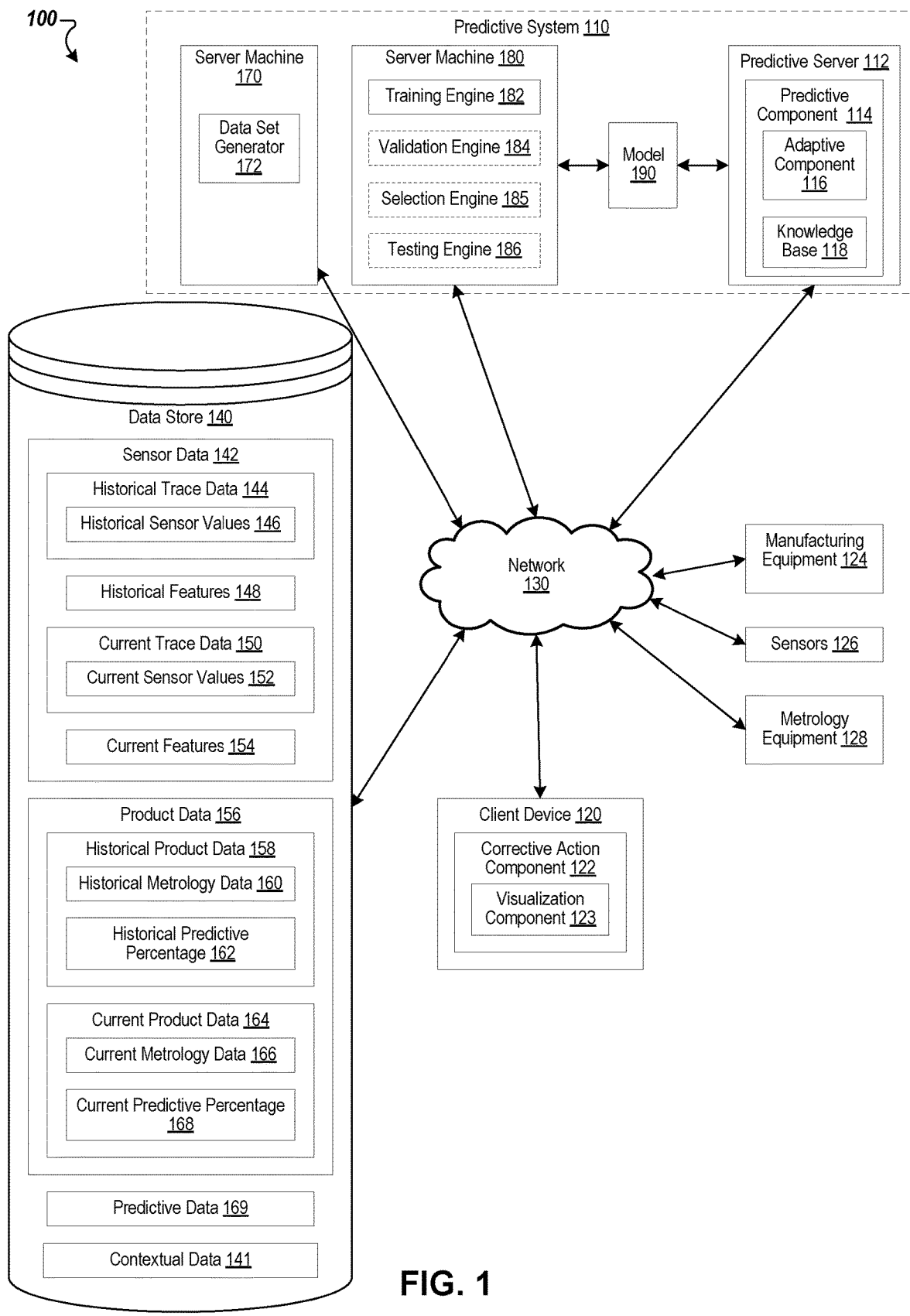
FIG. 1 is a block diagram illustrating an exemplary system architecture, according to certain embodiments.

FIG. 1 is a block diagram illustrating an exemplary system 100 (exemplary system architecture), according to certain embodiments. The system 100 includes a client device 120, manufacturing equipment 124, sensors 126, metrology equipment 128, a predictive server 112 (e.g., to generate predictive data, to provide model adaptation, to use a knowledge base, etc.), and a data store 140. The predictive server 112 may be part of a predictive system 110. The predictive system 110 may further include server machines 170 and 180. The manufacturing equipment 124 and sensors 126 may be part of a sensor system that includes a sensor server (e.g., field service server (FSS) at a manufacturing facility) and sensor identifier reader (e.g., front opening unified pod (FOUP) radio frequency identification (RFID) reader for sensor system). The metrology equipment may be part of a metrology system that includes a metrology server (e.g., metrology database, metrology folders, etc.) and metrology identifier reader (e.g., FOUP RFID reader for metrology system).

The sensors 126 may provide sensor data 142 associated with manufacturing equipment 124 (e.g., associated with producing, by manufacturing equipment 124, corresponding products, such as wafers). The sensor data 142 may be used for equipment health and/or product health (e.g., product quality). The manufacturing equipment 124 may produce products following a recipe or performing runs over a period of time. Sensor data 142 received over a period of time (e.g., corresponding to at least part of a recipe or run) may be referred to as trace data (e.g., historical trace data 144, current trace data 150) which may include sensor values (e.g. historical sensor values 146, current sensor values 152) received from different sensors 126 over time.

The sensor data 142 (e.g., trace data, sensor values) may include a value of one or more of temperature (e.g., heater temperature), spacing (SP), pressure, high frequency radio frequency (HFRF), voltage of electrostatic chuck (ESC), electrical current, flow, power, voltage, etc. Sensor data 142 may be associated with or indicative of manufacturing parameters such as hardware parameters (e.g., settings or components (e.g., size, type, etc.) of the manufacturing equipment 124) or process parameters of the manufacturing equipment. The sensor data 142 may be provided while the manufacturing equipment 124 is performing manufacturing processes (e.g., equipment readings when processing products). The sensor data 142 may be different for each product (e.g., each wafer).

The metrology equipment 128 may provide product data 156 (e.g., historical metrology data 160, current metrology data 166, property data of wafers, yield) associated with products (e.g., wafers) produced by the manufacturing equipment 124. The product data 156 may include a value of one or more of film property data (e.g., wafer spatial film properties), dimensions (e.g., thickness, height, etc.), dielectric constant, dopant concentration, density, defects, etc. The product data 156 may be of a finished or semi-finished product. The product data 156 may be different for each product (e.g., each wafer). In some embodiments, product data 156 (e.g., metrology data) may be used for supervised machine learning.

In some embodiments, the client device 120 may provide product data 156 (e.g., product data). Product data 156 may include historical predictive percentage 162 which indicates an amount of products that have been produced that were normal or abnormal (e.g., 98% normal products). Product data 156 may include current predictive percentage 168 which indicates an amount of products that are being produced that are predicted as normal or abnormal. The product data 156 may include one or more of yield a previous batch of products, average yield, predicted yield, predicted amount of defective or non-defective product, or the like. For example, if yield on a first batch of product is 98% (e.g., 98% of the products were normal and 2% were abnormal), the client device 120 may provide product data 156 indicating that the upcoming batch of product is to have a yield of 98%.

In some embodiments, the predictive system 110 may generate predictive data 169 using supervised machine learning (e.g., supervised data set, product data 156 includes metrology data, etc.). In some embodiments, the predictive system 110 may generate predictive data 169 using semi-supervised learning (e.g., semi-supervised data set, product data 156 is a predictive percentage, etc.). In some embodiments, the predictive system 110 may generate predictive data 169 using unsupervised machine learning (e.g., unsupervised data set, clustering, clustering based on product data 156, etc.).

The client device 120, manufacturing equipment 124, sensors 126, metrology equipment 128, predictive server 112, data store 140, server machine 170, and server machine 180 may be coupled to each other via a network 130 for generating predictive data 169 (e.g., FDC limits) to perform corrective actions.

The predictive data 169 may include one or more FDC limits. The predictive data 169 may include one or more first products associated with a first product classification based exclusively on a subset of features, one or more second products associated with a second product classification based exclusively on the subset of the features, and one or more third products associated with the first product classification or the second product classification based on an additional feature not within the subset of the features. The one or more first products may correspond to a first region above the FDC limit. The one or more second products may correspond to a second region below the FDC limit. The one or more third products may correspond to a gray region within the FDC limit. The predictive data 169 may include one or more plots (e.g., scatterplots). A plot may include a FDC limit, abnormal products, and normal products corresponding to the sensor data 142. The plot may have a first axis corresponding to a first feature (e.g., of current features 154) and a second axis corresponding to a second feature (e.g., of current features 154), lines on the plot that represent the FDC limit, a first set of indicators on a first side of the lines that represent abnormal products caused by the first feature and the second feature, and a second set of indicators within the lines that represent abnormal products caused by one or more additional features. The plot may also include a third set of indicators on a second side of the lines that represent normal products caused by the first feature and the second feature, and a fourth set of indicators within the lines that represent normal products caused by one or more additional features. Plots may be discarded that do not have a corresponding FDC limit to separate a substantial amount of abnormal products and normal products.

In some embodiments, network 130 is a public network that provides client device 120 with access to the predictive server 112, data store 140, and other publically available computing devices. In some embodiments, network 130 is a private network that provides client device 120 access to manufacturing equipment 124, sensors 126, metrology equipment 128, data store 140, and other privately available computing devices. Network 130 may include one or more wide area networks (WANs), local area networks (LANs), wired networks (e.g., Ethernet network), wireless networks (e.g., an 802.11 network or a Wi-Fi network), cellular networks (e.g., a Long Term Evolution (LTE) network), routers, hubs, switches, server computers, cloud computing networks, and/or a combination thereof.

The client device 120 may include a computing device such as personal computers (PCs), laptops, mobile phones, smart phones, tablet computers, netbook computers, network connected televisions ("smart TV"), network-connected media players (e.g., Blu-ray player), a set-top-box, over-the-top (OTT) streaming devices, operator boxes, etc. The client device 120 may be capable of receiving an indication associated with manufacturing equipment 124 (e.g., user input requesting predictive data 169 for manufacturing equipment 124, user input regarding corrective action associated with the manufacturing equipment 124), obtaining sensor data 142 (e.g., current features 154) associated with the manufacturing equipment 124 (e.g., from data store 140, etc.), providing the sensor data 142 (e.g., current features 154) associated with the manufacturing equipment 124 to the predictive system 110, receiving output (e.g., predictive data 169, one or more FDC limits) from the predictive system 110, and causing a corrective action (e.g., based on the output) associated with the manufacturing equipment 124. Each client device 120 may include an operating system that allows users to one or more of generate, view, or edit data (e.g., indication associated with manufacturing equipment 124, corrective actions associated with manufacturing equipment 124, etc.).

In some embodiments, the historical product data 158 corresponds to historical property data of products (e.g., produced using manufacturing parameters associated with historical trace data 144) and the predictive data 169 is associated with predicted property data (e.g., of products to be produced or that have been produced using the current trace data 150). In some embodiments, the predictive data 169 is predicted metrology data (e.g., virtual metrology data) of the products to be produced or that have been produced using the current trace data 150. In some embodiments, the predictive data 169 is an indication of abnormal products and one or more causes of the abnormal products. In some embodiments, the predictive data 169 includes one or more FDC limits that indicate the one or more causes of the abnormal products.

Performing metrology can be costly in terms of time required, metrology equipment 128 used, energy consumed, bandwidth used to send the metrology data, processor overhead to process the metrology data, etc. By inputting sensor data 142 (e.g., manufacturing parameters that are to be used to manufacture a product, current features 154) and receiving output of predictive data 169, system 100 can have the technical advantage of avoiding the costly process of using metrology equipment 128 to generate current metrology data 166 for current trace data 150.

Performing manufacturing processes that result in defective products can be costly in time, energy, products, manufacturing equipment 124 used to make the defective products, the cost of identifying the defects and discarding the defective product, etc. By inputting sensor data 142 (e.g., manufacturing parameters that are being used or are to be used to manufacture a product), receiving output of predictive data 169, and performing a corrective action based on the predictive data 169, system 100 can have the technical advantage of avoiding the cost of producing, identifying, and discarding defective products.

Performing manufacturing processes that result in failure of the components of the manufacturing equipment 124 can be costly in downtime, damage to products, damage to equipment, express ordering replacement components, etc. By inputting sensor data 142 (e.g., manufacturing parameters that are being used or are to be used to manufacture a product), receiving output of predictive data 169, and performing corrective action (e.g., predicted operational maintenance, such as replacement, processing, cleaning, etc. of components) based on the predictive data 169, system 100 can have the technical advantage of avoiding the cost of one or more of unexpected component failure, unscheduled downtime, productivity loss, unexpected equipment failure, product scrap, or the like.

Manufacturing parameters may be suboptimal for producing product which may have costly results of increased resource (e.g., energy, coolant, gases, etc.) consumption, increased amount of time to produce the products, increased component failure, increased amounts of defective products, etc. By inputting the sensor data 142 into the trained machine learning model 190, receiving an output of predictive data 169, and performing (e.g., based on the predictive data 169) a corrective action of updating manufacturing parameters (e.g., setting optimal manufacturing parameters), system 100 can have the technical advantage of using optimal manufacturing parameters (e.g., hardware parameters, process parameters, optimal design) to avoid costly results of suboptimal manufacturing parameters.

Corrective action may be associated with one or more of computational process control (CPC), statistical process control (SPC), advanced process control (APC), model-based process control, preventative operative maintenance, design optimization, updating of manufacturing parameters, feedback control, machine learning modification, or the like.

Sensor data 142 may be associated with manufacturing processes of manufacturing equipment 124 and product data 156 (e.g., metrology data) may be associated with properties of the finished product produced by the manufacturing processes. For example, the manufacturing equipment 124 may be a drilling machine and the manufacturing processes may be drilling a hole in a product. The sensor data 142 may indicate the drill rotation, the drill bit age, the rate of drill insertion, and the rate of drill removal. The product data 156 may indicate a hole diameter, a hole depth, a hole roundness, whether the hole is defective, etc. The machine learning model 190 may be trained based on data input of sensor data 142 associated with drilling holes in products and target output of product data 156 (e.g., metrology data, whether the product is defective) associated with the drilled holes. The trained machine learning model 190 may receive input of current trace data 150 (e.g., drill rotation, drill bit age, rate of drill insertion/removal, etc.) that is to be used for drilling holes. Based on the input of the current trace data 150, the trained machine learning model 190 may generate output of predictive data 169 (e.g., predicted properties of products manufactured, such as holes drilled, using the current trace data 150). Based on the output (e.g., predictive data 169), the client device 120 (e.g., via corrective action component 122) may cause a corrective action to be performed. In some embodiments, visualization component 123 of the corrective action component 122 generates a plot with axes of features, a normal region corresponding to products that are normal based on the features, an abnormal region corresponding to products that are abnormal based on the features, and a gray region corresponding to products that are normal or abnormal based on at least one additional feature (e.g., instead of or in addition to one or more of the features of the axes).

In some embodiments, the corrective action includes providing an alert (e.g., an alarm to stop or not perform the manufacturing process if the predictive data 169 indicates a predicted abnormality, such as the hole is predicted to not be round). In some embodiments, the corrective action includes providing feedback control (e.g., modifying a manufacturing parameter, such as to slow down the drill removal responsive to the predictive data 169 indicating the hole is predicted to not be round). In some embodiments, the corrective action includes providing machine learning (e.g., modifying one or more manufacturing parameters, such as drill rotation, rate of insertion, rate of removal, etc. based on the predictive data 169). In some embodiments, the corrective action is causing updates to one or more manufacturing parameters.

Manufacturing parameters may include hardware parameters (e.g., replacing components, using certain components, etc.) and/or process parameters (e.g., temperature, pressure, flow, rate, electrical current, voltage, etc.). In some embodiments, the corrective action includes causing preventative operative maintenance (e.g., replace, process, clean, etc. components of the manufacturing equipment 124). In some embodiments, the corrective action includes causing design optimization (e.g., updating manufacturing parameters, manufacturing processes, manufacturing equipment 124, etc. for an optimized product).

The client device 120 may include a corrective action component 122. Corrective action component 122 may receive user input (e.g., via a graphical user interface (GUI) displayed via the client device 120) of an indication associated with manufacturing equipment 124. In some embodiments, the corrective action component 122 transmits the indication to the predictive system 110, receives output (e.g., predictive data 169) from the predictive system 110, determines a corrective action based on the output, and causes the corrective action to be implemented. In some embodiments, the corrective action component 122 transmits the indication associated with manufacturing equipment 124 to the predictive system 110, receives an indication of a corrective action from the predictive system 110, and causes the corrective action to be implemented.

The predictive server 112, server machine 170, and server machine 180 may each include one or more computing devices such as a rackmount server, a router computer, a server computer, a personal computer, a mainframe computer, a laptop computer, a tablet computer, a desktop computer, graphics processing unit (GPU), accelerator application-specific integrated circuit (ASIC) (e.g., tensor processing unit (TPU)), etc.

The predictive server 112 may include a predictive component 114. In some embodiments, the predictive component 114 may retrieve current features 154 of the sensor data 142 from the data store and generate output (e.g., predictive data 169) for performing corrective action associated with the manufacturing equipment 124 based on the current features 154. In some embodiments, the predictive component 114 may use a trained machine learning model 190 to determine the output for performing the corrective action based on the current features 154. The trained machine learning model 190 may be trained using the historical features 148 and historical product data 158 to learn key process and hardware parameters. Generating, by the trained machine learning model 190, output for performing corrective action may include prescribing, by the trained machine learning model 190, optimal operating conditions (e.g., process parameters) and/or space (e.g., hardware parameters). In some embodiments, the predictive component 114 determines predictive data 169 for performing corrective action by providing current features 154 into the trained machine learning model 190, obtaining output from the trained machine learning model 190, and determining predictive data 169 based on the output. The predictive component 114 may generate a plot as part of the predictive data 169 or the visualization component 123 may generate the plot based on the predictive data 169. The plot may have axes that correspond to features, a normal region that corresponds to products that are normal based on the features of the axes, an abnormal region that corresponds to products that are abnormal based on the features of the axes, and a gray region that corresponds to products that normal or abnormal based on at least one feature that is not part of the axes. The FDC limit may separate the abnormal region from the normal region. The gray region may be within the FDC limit (e.g., see FIGS. 6B-C).

The predictive component 114 may include an adaptive component 116 and/or knowledge base 118. The adaptive component may adjust the FDC limit based on a change (e.g., preventative maintenance, set point change, equipment constant change, process drift that does not cause abnormal products, etc.). The adaptive component 116 may track drift in the system (e.g., due to equipment aging, etc.). The knowledge base 118 may include an indication of whether drift should be considered normal or abnormal (e.g., whether drift should be tracked and rejected as a disturbance, whether the drift should be considered as a fault, subject matter expertise (SME)). The drift may or may not be associated with equipment or product degradation or a fault. The adaptive component 116 may adjust the FDC limit based on information received from the knowledge base 118 (e.g., what types of drift is acceptable, when to adjust the FDC limit, etc.). The adaptive component 116 may adjust the FDC limit without re-training the model 190 (e.g., based on acceptable drift).

Data store 140 may be a memory (e.g., random access memory), a drive (e.g., a hard drive, a flash drive), a database system, or another type of component or device capable of storing data. Data store 140 may include multiple storage components (e.g., multiple drives or multiple databases) that may span multiple computing devices (e.g., multiple server computers). The data store 140 may store sensor data 142 (e.g., historical trace data 144, historical sensor values 146, historical features 148, current trace data 150, current sensor values 152, current features 154), product data 156 (e.g., historical product data 158, historical metrology data 160, historical predictive percentage 162, current product data 164, current metrology data 166, current predictive percentage 168), and predictive data 169. The data store 140 may include contextual data 141 (e.g., recipe name, recipe step number, preventive maintenance indicator, operator, etc.). The historical trace data 144, historical features 148, historical product data 158 may be historical data (e.g., at least a portion for training the machine learning model 190). The current trace data 150 and current features 154 may be current data (e.g., at least a portion to be input into the trained machine learning model 190, subsequent to the historical data) for which predictive data 169 is to be generated (e.g., for performing corrective actions). The current product data 164 may also be current data (e.g., for re-training the trained machine learning model).

Sensor data 142 may include trace data, sensor values, and features. Product data 156 may include metrology data, predictive percentage, or the like. Each instance (e.g., set) of sensor data 142 may correspond to a corresponding product carrier, a corresponding timestamp, and/or a corresponding product (e.g., wafer). In some embodiments, each instance (e.g., set) of product data 156 may correspond to a corresponding product carrier, a corresponding timestamp, and/or a corresponding product (e.g., wafer). In some embodiments, the product data 156 corresponds to a set of products (e.g., 2% of the set of products are abnormal).

In some embodiments, the client device 120 may store current trace data 150 (e.g., sensor data received after the receiving of the historical trace data 144, sensor data received after training of the model 190, sensor data for which there is no metrology data) in the data store 140 and the predictive server 112 may retrieve the current sensor data from the data store 140. In some embodiments, the predictive server 112 may store output (e.g., predictive data 169) of the trained machine learning model 190 in the data store 140 and the client device 120 may retrieve the output from the data store 140.

In some embodiments, the client device 120 may generate features (e.g., historical features 148, current features 154) from trace data (e.g., historical trace data 144, current trace data 150) and store the features in the data store 140. In some embodiments, the predictive server 112 (e.g., predictive component 114) may generate features (e.g., historical features 148, current features 154) from trace data (e.g., historical trace data 144, current trace data 150) and store the features in the data store. In some embodiments, the features are a pattern in the trace data (e.g., slope, width, height, peak, etc.) or a combination of sensor values from the trace data (e.g., power derived from voltage and current, etc.).

In some embodiments, predictive system 110 further includes server machine 170 and server machine 180. Server machine 170 includes a data set generator 172 that is capable of generating data sets (e.g., a set of data inputs and a set of target outputs) to train, validate, and/or test a machine learning model 190. Some operations of data set generator 172 are described in detail below with respect to FIGS. 2 and 4D. In some embodiments, the data set generator 172 may partition the historical data (e.g., historical features 148 and historical product data 158) into a training set (e.g., sixty percent of the historical features 148 and historical product data 158), a validating set (e.g., twenty percent of the historical features 148 and historical product data 158), and a testing set (e.g., twenty percent of the historical features 148 and historical product data 158). In some embodiments, the predictive system 110 (e.g., via predictive component 114) generates multiple sets of features. For example a first set of features may correspond to a first set of types of sensor data (e.g., from a first set of sensors, first combination of values from first set of sensors, first patterns in the values from the first set of sensors) that correspond to each of the data sets (e.g., training set, validation set, and testing set) and a second set of features may correspond to a second set of types of sensor data (e.g., from a second set of sensors different from the first set of sensors, second combination of values different from the first combination, second patterns different from the first patterns) that correspond to each of the data sets.

Server machine 180 includes a training engine 182, a validation engine 184, selection engine 185, and/or a testing engine 186. An engine (e.g., training engine 182, a validation engine 184, selection engine 185, and a testing engine 186) may refer to hardware (e.g., circuitry, dedicated logic, programmable logic, microcode, processing device, etc.), software (such as instructions run on a processing device, a general purpose computer system, or a dedicated machine), firmware, microcode, or a combination thereof. The training engine 182 may be capable of training a machine learning model 190 using one or more sets of features associated with the training set from data set generator 172. The training engine 182 may generate multiple trained machine learning models 190, where each trained machine learning model 190 corresponds to a distinct set of features of the training set (e.g., sensor data from a distinct set of sensors). For example, a first trained machine learning model may have been trained using all features (e.g., X1-X5), a second trained machine learning model may have been trained using a first subset of the features (e.g., X1, X2, X4), and a third trained machine learning model may have been trained using a second subset of the features (e.g., X1, X3, X4, and X5) that may partially overlap the first subset of features.

The validation engine 184 may be capable of validating a trained machine learning model 190 using a corresponding set of features of the validation set from data set generator 172. For example, a first trained machine learning model 190 that was trained using a first set of features of the training set may be validated using the first set of features of the validation set. The validation engine 184 may determine an accuracy of each of the trained machine learning models 190 based on the corresponding sets of features of the validation set. The validation engine 184 may discard trained machine learning models 190 that have an accuracy that does not meet a threshold accuracy. In some embodiments, the selection engine 185 may be capable of selecting one or more trained machine learning models 190 that have an accuracy that meets a threshold accuracy. In some embodiments, the selection engine 185 may be capable of selecting the trained machine learning model 190 that has the highest accuracy of the trained machine learning models 190.

The testing engine 186 may be capable of testing a trained machine learning model 190 using a corresponding set of features of a testing set from data set generator 172. For example, a first trained machine learning model 190 that was trained using a first set of features of the training set may be tested using the first set of features of the testing set. The testing engine 186 may determine a trained machine learning model 190 that has the highest accuracy of all of the trained machine learning models based on the testing sets.

The machine learning model 190 may refer to the model artifact that is created by the training engine 182 using a training set that includes data inputs and corresponding target outputs (correct answers for respective training inputs). Patterns in the data sets can be found that map the data input to the target output (the correct answer), and the machine learning model 190 is provided mappings that captures these patterns. The machine learning model 190 may use one or more of support vector machine (SVM), Radial Basis Function (RBF), clustering, supervised machine learning, semi-supervised machine learning, unsupervised machine learning, k-nearest neighbor algorithm (k-NN), linear regression, random forest, neural network (e.g., artificial neural network), etc.

Predictive component 114 may provide current features 154 to the trained machine learning model 190 and may run the trained machine learning model 190 on the input to obtain one or more outputs. The predictive component 114 may be capable of determining (e.g., extracting) predictive data 169 from the output of the trained machine learning model 190 and may determine (e.g., extract) confidence data from the output that indicates a level of confidence that the predictive data 169 corresponds to the products produced or to be produced using the manufacturing equipment 124 at the current sensor values. The predictive component 114 or corrective action component 122 may use the confidence data to decide whether to cause a corrective action associated with the manufacturing equipment 124 based on the predictive data 169.

The confidence data may include or indicate a level of confidence that the predictive data 169 corresponds to property data of the products associated with at least a portion of the current features 154 (e.g., set of features, two features mapped per projection, etc.). In one example, the level of confidence is a real number between 0 and 1 inclusive, where 0 indicates no confidence that the predictive data 169 corresponds to property data of the products associated with the current trace data 150 and 1 indicates absolute confidence that the predictive data 169 corresponds to property data of the products associated with the current trace data 150. In some embodiments, the system 100 may use predictive system 110 to determine predictive data 169 instead of using the metrology equipment 128 to determine current metrology data 166. In some embodiments, responsive to the confidence data indicating a level of confidence that is below a threshold level, the system 100 may cause the metrology equipment 128 to generate the current metrology data 166. Responsive to the confidence data indicating a level of confidence below a threshold level for a predetermined number of instances (e.g., percentage of instances, frequency of instances, total number of instances, etc.) the predictive component 114 may cause the trained machine learning model 190 to be re-trained (e.g., based on the current features 154 and current product data 164, etc.).

For purpose of illustration, rather than limitation, aspects of the disclosure describe the training of a machine learning model using historical features 148 and historical product data 158 and inputting current features 154 into the trained machine learning model to determine predictive data 169. In other implementations, a heuristic model or rule-based model is used to determine predictive data 169 (e.g., without using a trained machine learning model). Predictive component 114 may monitor historical features 148 and historical product data 158. Any of the information described with respect to data inputs 210 of FIG. 2 may be monitored or otherwise used in the heuristic or rule-based model.

In some embodiments, the functions of client device 120, predictive server 112, server machine 170, and server machine 180 may be provided by a fewer number of machines. For example, in some embodiments server machines 170 and 180 may be integrated into a single machine, while in some other embodiments, server machine 170, server machine 180, and predictive server 112 may be integrated into a single machine. In some embodiments, client device 120 and predictive server 112 may be integrated into a single machine.

In general, functions described in one embodiment as being performed by client device 120, predictive server 112, server machine 170, and server machine 180 can also be performed on predictive server 112 in other embodiments, if appropriate. In addition, the functionality attributed to a particular component can be performed by different or multiple components operating together. For example, in some embodiments, the predictive server 112 may determine the corrective action based on the predictive data 169. In another example, client device 120 may determine the predictive data 169 based on output from the trained machine learning model.

In addition, the functions of a particular component can be performed by different or multiple components operating together. One or more of the predictive server 112, server machine 170, or server machine 180 may be accessed as a service provided to other systems or devices through appropriate application programming interfaces (API).

In embodiments, a "user" may be represented as a single individual. However, other embodiments of the disclosure encompass a "user" being an entity controlled by a plurality of users and/or an automated source. For example, a set of individual users federated as a group of administrators may be considered a "user."

Although embodiments of the disclosure are discussed in terms of FDC limits, embodiments may be applied to data quality evaluation, feature enhancement, model evaluation, virtual metrology (VM), FDC, predictive maintenance (PdM), limit optimization, or the like.

Although embodiments of the disclosure are discussed in terms of generating predictive data 169 to perform a corrective action in manufacturing facilities (e.g., semiconductor manufacturing facilities), embodiments may also be generally applied to generating limits to perform an action. Embodiments may be generally applied to generating limits based on different types of data. For example, features of sensor data and corresponding component failure data may be used for predicting end of life of components. In another example, features of images may be used for predicting image classification of images.

Figure 2:
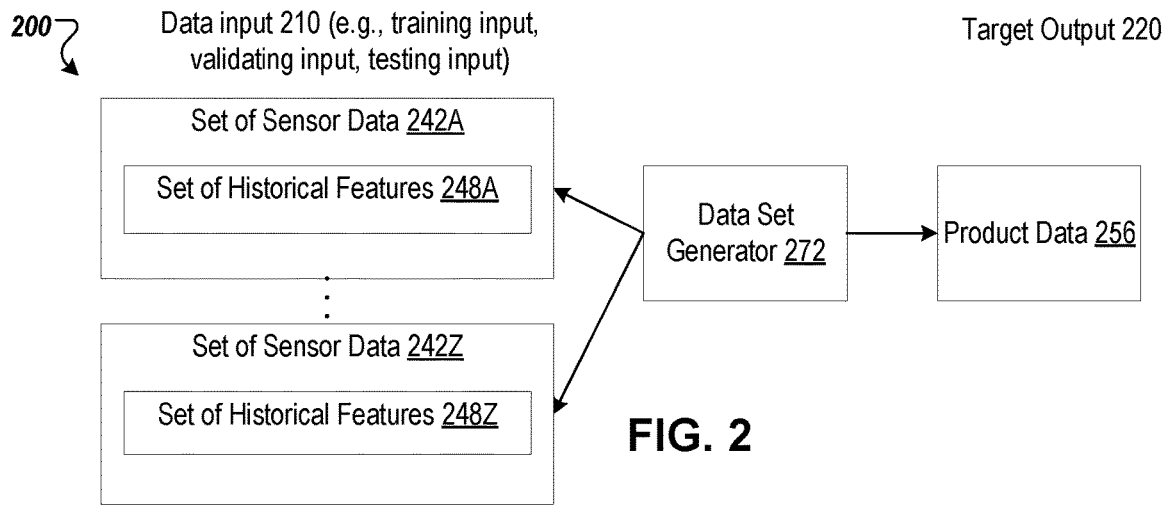
FIG. 2 is an example data set generator to create data sets for a machine learning model, according to certain embodiments.

FIG. 2 is an example data set generator 272 (e.g., data set generator 172 of FIG. 1) to create data sets for a machine learning model (e.g., model 190 of FIG. 1) using sensor data 242 (e.g., sensor data 142 of FIG. 1) and product data 256 (e.g., product data 156 of FIG. 1), according to certain embodiments. System 200 of FIG. 2 shows data set generator 272, data inputs 210, and target output 220.

In some embodiments, data set generator 272 generates a data set (e.g., training set, validating set, testing set) that includes one or more data inputs 210 (e.g., training input, validating input, testing input) and one or more target outputs 220 that correspond to the data inputs 210. The data set may also include mapping data that maps the data inputs 210 to the target outputs 220. Data inputs 210 may also be referred to as "features," "attributes," or "information." In some embodiments, data set generator 272 may provide the data set to the training engine 182, validating engine 184, or testing engine 186, where the data set is used to train, validate, or test the machine learning model 190. Some embodiments of generating a training set may further be described with respect to FIG. 4D.

In some embodiments, data set generator 272 generates the data input 210 and target output 220. In some embodiments, data inputs 210 may include one or more sets of sensor data 242 (e.g., sensor data 142 of FIG. 1). Each set of sensor data may include historical features 248 (e.g., historical features 148 of FIG. 1). Each instance of sensor data 242 may include one or more of sensor data from one or more types of sensors, combination of sensor data from one or more types of sensors, patterns from sensor data from one or more types of sensors, etc. Target output may include product data 256 (e.g., product data 156 of FIG. 1).

In some embodiments, data set generator 272 may generate a first data input corresponding to a first set of historical features 242A to train, validate, or test a first machine learning model and the data set generator 272 may generate a second data input corresponding to a second set of historical features 242B to train, validate, or test a second machine learning model.

In some embodiments, the data set generator 272 may discretize (e.g., segment) one or more of the data input 210 or the target output 220 (e.g., to use in classification algorithms for regression problems). Discretization (e.g., segmentation via a sliding window) of the data input 210 or target output 220 may transform continuous values of variables into discrete values. In some embodiments, the discrete values for the data input 210 indicate discrete manufacturing parameters to obtain a target output 220 (e.g., discrete property data).

Data inputs 210 and target outputs 220 to train, validate, or test a machine learning model may include information for a particular facility (e.g., for a particular semiconductor manufacturing facility). For example, the sensor data 242 and product data 256 may be for the same manufacturing facility.

In some embodiments, the information used to train the machine learning model may be from specific types of manufacturing equipment 124 of the manufacturing facility having specific characteristics and allow the trained machine learning model to determine outcomes for a specific group of manufacturing equipment 124 based on input for current sensor data (e.g., current features 154) associated with one or more components sharing characteristics of the specific group. In some embodiments, the information used to train the machine learning model may be for components from two or more manufacturing facilities and may allow the trained machine learning model to determine outcomes for components based on input from one manufacturing facility.

In some embodiments, subsequent to generating a data set and training, validating, or testing machine learning model 190 using the data set, the machine learning model 190 may be further trained, validated, or tested (e.g., current features 154 and current product data 164 of FIG. 1) or adjusted (e.g., adjusting weights associated with input data of the machine learning model 190, such as connection weights in a neural network).

Figure 3:
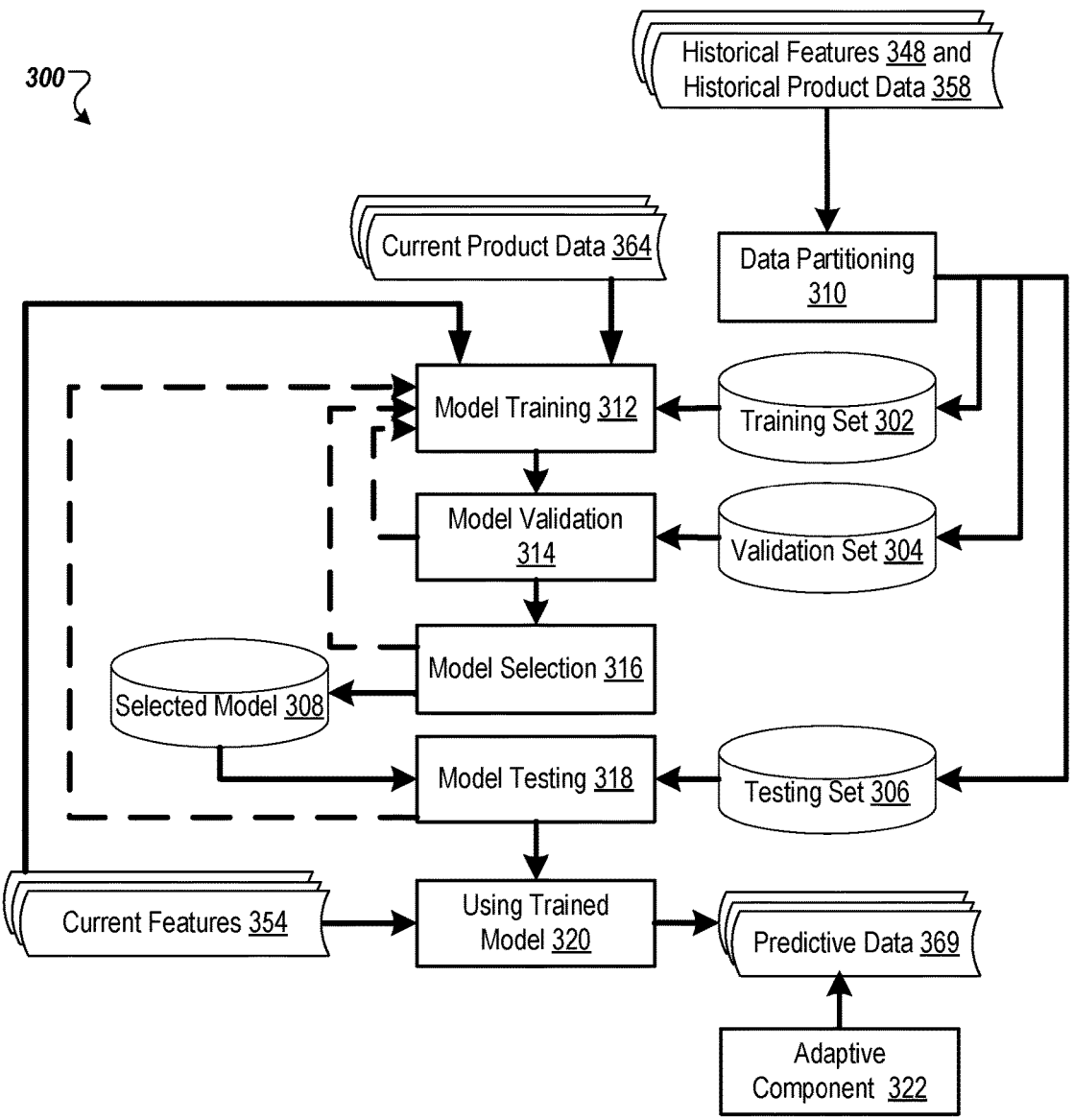
FIG. 3 is a block diagram illustrating determining predictive data, according to certain embodiments.

FIG. 3 is a block diagram illustrating a system 300 for generating predictive data 369 (e.g., predictive data 169 of FIG. 1), according to certain embodiments. The system 300 may be used to determine a corrective action associated with manufacturing equipment 124 based on the predictive data 369.

At block 310, the system 300 (e.g., predictive system 110 of FIG. 1) performs data partitioning (e.g., via data set generator 172 of server machine 170 of FIG. 1) of the historical features 348 and the historical product data 358 (e.g., historical features 148 and the historical product data 158 of FIG. 1) to generate the training set 302, validation set 304, and testing set 306. For example, the training set may be 60% of the historical features 348 and historical product data 358, the validation set may be 20% of the historical features 348 and historical product data 358, and the testing set may be 20% of the historical features 348 and historical product data 358. The system 300 may generate a plurality of sets of features for each of the training set, the validation set, and the testing set. For example, if the historical data (e.g., historical features 348 and historical product data 358) includes features derived from sensor data from 20 sensors (e.g., sensors 126 of FIGS. 1) and 100 products (e.g., products that each correspond to the sensor data from the 20 sensors), a first set of features may be sensors 1-10, a second set of features may be sensors 11-20, the training set may be products 1-60, the validation set may be products 61-80, and the testing set may be products 81-100. In this example, the first set of features of the training set would be sensor data from sensors 1-10 for products 1-60.

At block 312, the system 300 performs model training (e.g., via training engine 182 of FIG. 1) using the training set 302. The system 300 may train multiple models using multiple sets of features of the training set 302 (e.g., a first set of features of the training set 302, a second set of features of the training set 302, etc.). For example, system 300 may train a machine learning model to generate a first trained machine learning model using the first set of features in the training set (e.g., sensor data from sensors 1-10 for products 1-60) and to generate a second trained machine learning model using the second set of features in the training set (e.g., sensor data from sensors 11-20 for products 1-60). In some embodiments, the first trained machine learning model and the second trained machine learning model may be combined to generate a third trained machine learning model (e.g., which may be a better predictor than the first or the second trained machine learning model on its own). In some embodiments, sets of features used in comparing models may overlap (e.g., first set of features being sensor data from sensors 1-15 and second set of features being sensors 5-20). In some embodiments, hundreds of models may be generated including models with various permutations of features and combinations of models.

At block 314, the system 300 performs model validation (e.g., via validation engine 184 of FIG. 1) using the validation set 304. The system 300 may validate each of the trained models using a corresponding set of features of the validation set 304. For example, system 300 may validate the first trained machine learning model using the first set of features in the validation set (e.g., sensor data from sensors 1-10 for products 61-80) and the second trained machine learning model using the second set of features in the validation set (e.g., sensor data from sensors 11-20 for products 61-80). In some embodiments, the system 300 may validate hundreds of models (e.g., models with various permutations of features, combinations of models, etc.) generated at block 312. At block 314, the system 300 may determine an accuracy of each of the one or more trained models (e.g., via model validation) and may determine whether one or more of the trained models has an accuracy that meets a threshold accuracy. Responsive to determining that none of the trained models has an accuracy that meets a threshold accuracy, flow returns to block 312 where the system 300 performs model training using different sets of features of the training set. Responsive to determining that one or more of the trained models has an accuracy that meets a threshold accuracy, flow continues to block 316. The system 300 may discard the trained machine learning models that have an accuracy that is below the threshold accuracy (e.g., based on the validation set).

At block 316, the system 300 performs model selection (e.g., via selection engine 185 of FIG. 1) to determine which of the one or more trained models that meet the threshold accuracy has the highest accuracy (e.g., the selected model 308, based on the validating of block 314). Responsive to determining that two or more of the trained models that meet the threshold accuracy have the same accuracy, flow may return to block 312 where the system 300 performs model training using further refined training sets corresponding to further refined sets of features for determining a trained model that has the highest accuracy.

At block 318, the system 300 performs model testing (e.g., via testing engine 186 of FIG. 1) using the testing set 306 to test the selected model 308. The system 300 may test, using the first set of features in the testing set (e.g., sensor data from sensors 1-10 for products 81-100), the first trained machine learning model to determine the first trained machine learning model meets a threshold accuracy (e.g., based on the first set of features of the testing set 306). Responsive to accuracy of the selected model 308 not meeting the threshold accuracy (e.g., the selected model 308 is overly fit to the training set 302 and/or validation set 304 and is not applicable to other data sets such as the testing set 306), flow continues to block 312 where the system 300 performs model training (e.g., retraining) using different training sets corresponding to different sets of features (e.g., sensor data from different sensors). Responsive to determining that the selected model 308 has an accuracy that meets a threshold accuracy based on the testing set 306, flow continues to block 320. In at least block 312, the model may learn patterns in the historical features 348 and historical product data 358 to make predictions and in block 318, the system 300 may apply the model on the remaining data (e.g., testing set 306) to test the predictions.

At block 320, system 300 uses the trained model (e.g., selected model 308) to receive current features 354 (e.g., current features 154 of FIG. 1) and determines (e.g., extracts), from the output of the trained model, predictive data 369 (e.g., predictive data 169 of FIG. 1, FDC limit) to perform corrective actions associated with the manufacturing equipment 124. In some embodiments, the current features 354 may correspond to the same types of features in the historical features 348. In some embodiments, the current features 354 correspond to a same type of features as a subset of the types of features in historical features 348 that are used to train the selected model 308.

In some embodiments, current product data 364 (e.g., current product data 164 of FIG. 1) is received from the metrology equipment (e.g., metrology equipment 128 of FIG. 1) and the model 308 is re-trained based on the current features 354 and the current product data 364. In some embodiments, a new model is trained based on the current product data 364 and the current features 354.

In some embodiments, adaptive component 322 (e.g., adaptive component 116) may adjust the predictive data 369 (e.g., FDC limit). For example, over time, the manufacturing equipment may age and the values may drift in a way that does not cause product abnormalities. The adaptive component 322 may cause the FDC limits to be adjusted to account for the drift (e.g., based on SME indicating that the drift is acceptable). The adaptive component 322 may adjust the FDC limits without re-training the model 308.

In some embodiments, one or more of the acts 310-320 may occur in various orders and/or with other acts not presented and described herein. In some embodiments, one or more of acts 310-320 may not be performed. For example, in some embodiments, one or more of data partitioning of block 310, model validation of block 314, model selection of block 316, or model testing of block 318 may not be performed.

FIGS. 4A-E are flow diagrams of methods 400A-E associated with generating an FDC limit, according to certain embodiments. Methods 400A-E may be performed by processing logic that may include hardware (e.g., circuitry, dedicated logic, programmable logic, microcode, processing device, etc.), software (such as instructions run on a processing device, a general purpose computer system, or a dedicated machine), firmware, microcode, or a combination thereof. In some embodiment, methods 400A-E may be performed, in part, by predictive system 110. Methods 400A-B may be performed by server machine 180 (e.g., training engine 182, etc.). Methods 400C and 400E may be performed by predictive server 112 (e.g., predictive component 114). Method 400D may be performed, in part, by predictive system 110 (e.g., server machine 170, data set generator 172, etc.). Predictive system 110 may use method 400D to generate a data set to at least one of train, validate, or test a machine learning model, in accordance with embodiments of the disclosure. In some embodiments, one or more operations of method 400D may be performed by data set generator 172 of server machine 170 as described with respect to FIGS. 1 and 2. In some embodiments, a non-transitory storage medium stores instructions that when executed by a processing device (e.g., of predictive system 110, of server machine 180, of predictive server 112, etc.) cause the processing device to perform one or more of methods 400A-E.

For simplicity of explanation, methods 400A-E are depicted and described as a series of acts. However, acts in accordance with this disclosure can occur in various orders and/or concurrently and with other acts not presented and described herein. Furthermore, not all illustrated acts may be performed to implement methods 400A-E in accordance with the disclosed subject matter. In addition, those skilled in the art will understand and appreciate that methods 400A-E could alternatively be represented as a series of interrelated states via a state diagram or events.

Figure 4A:
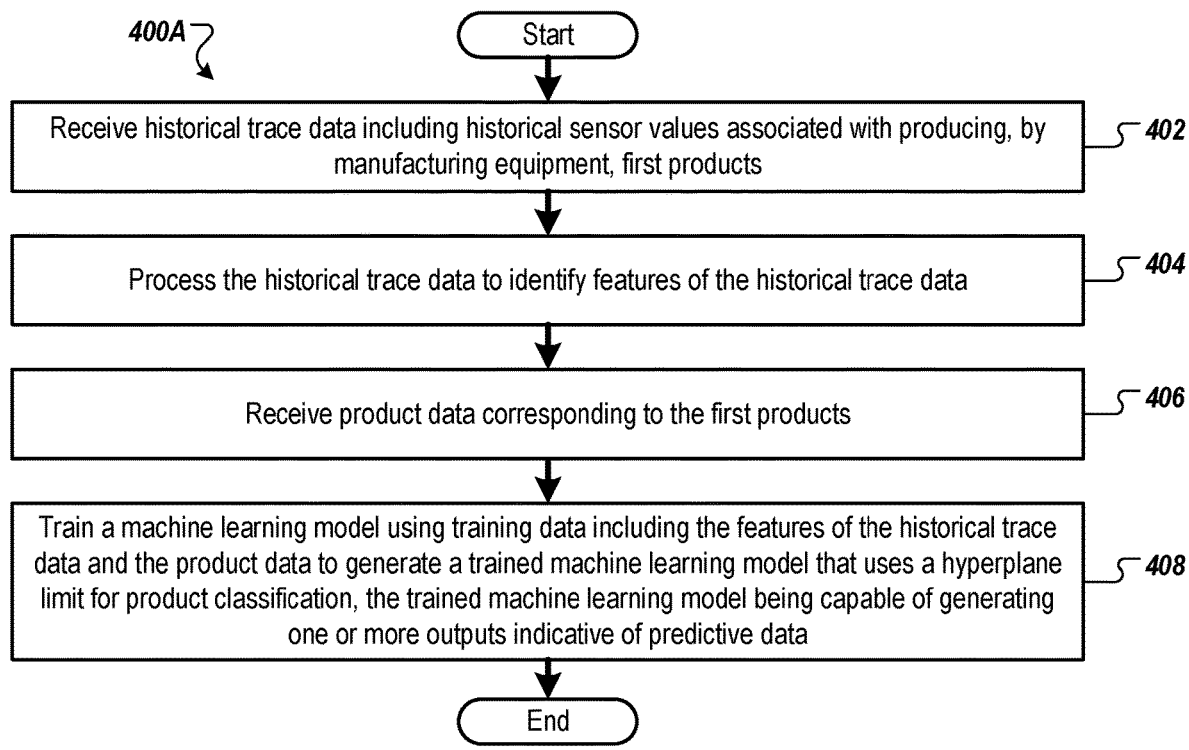
FIGS. 4A-E are flow diagrams of methods associated with generating a fault detection classification (FDC) limit, according to certain embodiments.

Referring to FIG. 4A, at block 402, the processing logic receives historical trace data including historical sensor values associated with producing, by manufacturing equipment, first products (e.g., wafers). The historical trace data may be from the execution of a recipe or a run of the manufacturing equipment to produce products over time. The historical trace data may include different types of sensor values (e.g., from different sensors), such as voltage, current, gas flow, pressure, temperature, etc.

At block 404, the processing logic processes the historical trace data to identify features of the historical trace data. For example, the historical trace data may include sensor values from 10 sensors. Features may be generated from the sensor values to generate 100 features. A feature may have a fixed or varying location within trace data, a feature may be found in all or some of the trace data, a feature may have fixed or varying parameters (e.g., spike with varying heights), and/or a feature may have single or multiple occurrences in trace data (e.g., a spike could be associated only with the beginning of a recipe step or may occur a varying number of times during a recipe step as the result of a static discharge). Features may include one or more of combinations of sensor values from sensors (e.g., summing, multiplying, subtracting, dividing, etc.), average of sensor values from a sensor, slope of sensor values from a sensor, properties (e.g., width, height, etc.) of a peak of sensor values from a sensor, patterns of sensor values from a sensor, frequency of sensor values from a sensor, etc. Processing of the historical trace data may include one or more acts of method 400B of FIG. 4B. The processing logic may one or more of use SME to determine a feature, look for patterns (e.g., sine waves) to determine a feature, or the like. In some embodiments, the processing logic determines, for the features, parameter data. Parameter data can include one or more of feature parameters, feature parameter distribution in space, feature parameter distribution in time, or frequency of feature occurrence in the current trace data. The parameter data may be provided as further input to train the machine learning model in block 408.

At block 406, the processing logic receives product data (e.g., historical metrology data, etc.) that corresponds to the first products. In some embodiments, at block 406, the processing logic may receive, from metrology equipment, metrology data associated with the first products and the processing logic may identify, based on the metrology data, a first subset of the first products that are abnormal and a second subset of the first products that are normal. The product data may be based on the first subset and the second subset. In some embodiments, at block 406, the processing logic may receive user input associated with a predicted percentage of the first products that are abnormal (e.g., yield, percentage of abnormal products, etc.) and may determine, based on the user input, a first amount of the first products that are abnormal or a second amount of the products that are normal. The product data may be based on one or more of the first amount or the second amount.

In some embodiments, the product data may correspond to normal products (e.g., no abnormal products). Active learning may be performed to identify other normal products (e.g., while other products are considered not normal). For example, responsive to the product data indicating that a set of normal products are labeled as normal, the processing logic may determine features of the set of normal products (e.g., via clustering), may identify a set of unlabeled products as having substantially similar features as the set of normal products, and may label the set of unlabeled products as normal. In some embodiments, no information may be available as to the level of normality or abnormality. Active learning may be performed to identify abnormal products that have features that are different from the majority of the products (e.g., under an assumption that the majority of the products are normal).

In some embodiments, the product data may correspond to normal products and abnormal products (e.g., 98% normal products, 2% abnormal products). Active learning may be performed to identify and label other normal and abnormal products. For example, responsive to the product data indicating that a set of normal products are labeled as normal and a set of abnormal products are labeled as abnormal, the processing logic may determine first features of the set of normal products and/or second features of the abnormal products, may identify a first set of unlabeled products as having substantially similar features as the set of normal products and a second set of unlabeled products as having substantially similar features as the set of abnormal products, and may label the first set of unlabeled as normal and the second set of unlabeled products as abnormal.

At block 408, the processing logic trains a machine learning model using training data including the features (e.g., selected feature parameters of the features) of the historical trace data and the product data to generate a trained machine learning model. The trained machine learning model may use a hyperplane limit for product classification. In some embodiments, the training of the machine learning model generates a hyperplane based on the features of the historical trace data and the product data. The hyperplane may separate classifications (e.g., normal, abnormal, cause of abnormal, degree of abnormal, etc.) of products in multi-dimensional space, where each dimension corresponds to one of the features of the historical trace data. The processing logic may use a support vector machine (SVM) using radial basis function (RBF) to create the hyperplane limit (e.g., hyperplane boundary) between classifications of products (e.g., normal products and abnormal products) in a multidimensional space (e.g., high dimensional space, a space of greater than two dimensions). An FDC limit that is a one-dimensional (1D) limit, a two-dimensional (2D) limit, or greater than 2D limit may be derived from the hyperplane limit. In some embodiments, the hyperplane limit may not completely separate normal and abnormal products. The processing logic may create a hyperplane limit that provides partial separation of normal and abnormal products according to an optimization function or other specification. In some embodiments, the optimization would be to minimize a weighted function of missed and false positives, where a positive is a prediction of an abnormal product.

In some embodiments, the product data indicates which products are abnormal or normal. The abnormal products may be mapped to specific features associated with specific portions of the historical trace data. For example, each of the abnormal products may be associated with a peak in temperature. The trained machine learning model may map the peak in temperature to producing an abnormal product.

In some embodiments, the product data indicates a percentage of the products that are abnormal (e.g., not mapped to specific features associated with specific portions of historical trace data). The trained machine learning model may map the corresponding peaks in the features to the percentage of the products that are abnormal. For example, if the product data indicates that 2% of the products are abnormal and 2% of the products had a specific peak in temperature, the trained machine learning model may map the specific peak in temperature to producing an abnormal product. In another example, if the product data indicates that a three-sigma limit is to be used, products with values of features (e.g., associated with the historical trace data) that are outside of the three-sigma limit may be considered abnormal and the trained machine learning model may map the values of features outside of the three-sigma limit to producing an abnormal product.

The machine learning model may be trained using target output including historical product data. In some embodiments, the historical product data is historical metrology data that corresponds to the same products as the features generated based on the historical trace data (e.g., historical metrology data may be diameter of a hole and the a feature may be sensor value of current times sensor value of voltage used to power the drill to create the hole). In some embodiments, the historical product data is a historical predictive percentage. For example, if average product yield is 98%, the target output may be an indication that 2% of the products are abnormal and/or 98% of the products are normal. The machine learning model may be trained to determine features (e.g., combinations of sensor values, patterns in sensor values, interactions between sensor values, etc.) that cause the abnormal products.

The trained machine learning model may be capable of generating one or more outputs indicative of predictive data (e.g., an FDC limit). The predictive data may be used to identify cause of abnormal products. For example, the trained machine learning model may provide a decision boundary visualization (e.g., visual representation of the FDC limit, a hyperplane limit projection). The trained machine learning model may provide multivariate limit optimization (e.g., via sliding window, incremental learning, filtering mechanism, etc.). In some embodiments, to identify the cause of abnormal products, the trained machine learning model performs feature ranking (e.g., ranks the causes of the abnormal products). The feature ranking may identify one or more of which features caused the abnormal products, the percentage of causation by each feature of the abnormal products, the probability of causation by each feature of the abnormal products, or the like.

In some embodiments, the trained machine learning model of 408 may be used to determine the hyperplane limit and/or one or more FDC limits (e.g., via method 400E of FIG. 4E) for the historical features generated from the historical trace data. The hyperplane limit and/or one or more FDC limits (e.g., generated from the historical features and historical product data) may be used in method 400C of FIG. 4C to determine one or more causes of abnormal products associated with current features of the current trace data.

Figure 4B:
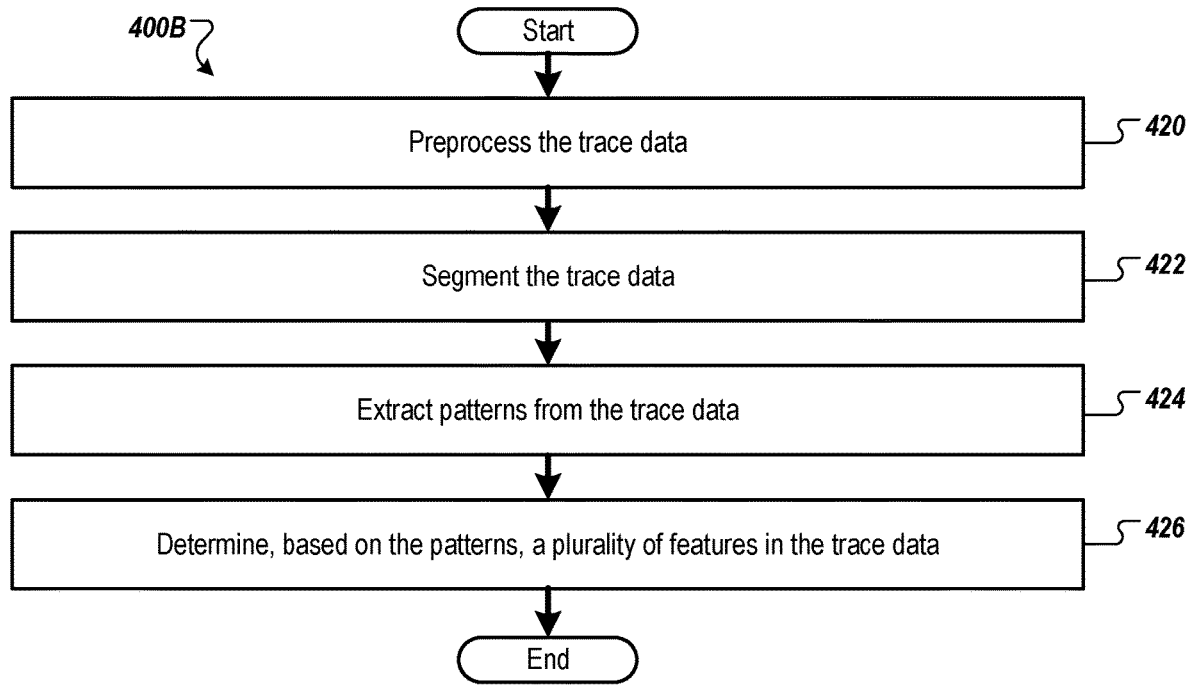
Figure 4C:
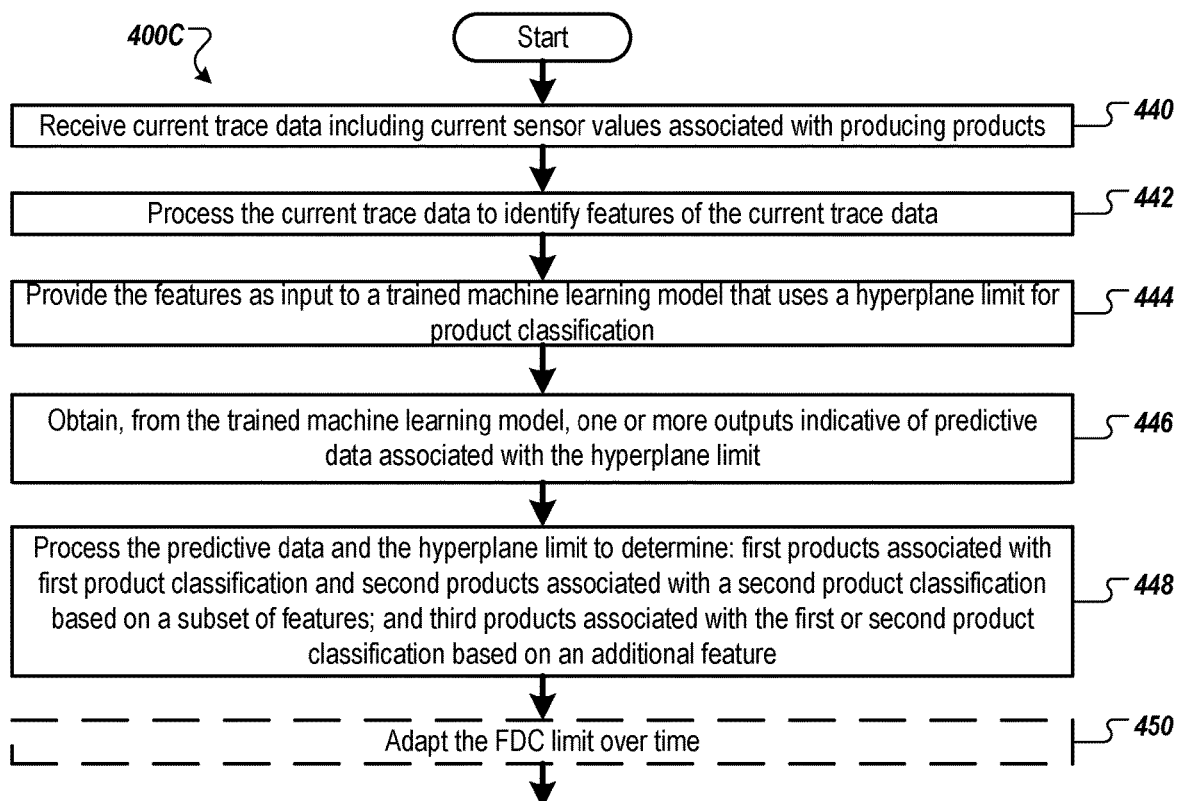

After the machine learning model has been trained in method 400A of FIG. 400A, the trained machine learning model may be used in method 400C FIG. 4C.

One or more acts of method 400B of FIG. 4B may be used to process historical trace data in block 404 of FIG. 4A or to process current trace data in block 442 of FIG. 4C.

Referring to FIG. 4B, at block 420, the processing logic preprocesses the historical trace data by one or more of removing outliers, aligning the historical trace data, or the like.

At block 422, the processing logic segments (e.g., windows), via a sliding window, the historical trace data to generate a boundary between steady state and transient segments (e.g., to generate segmented trace data). For example, a portion of the historical trace data that has a change in slope that is less than a threshold change in slope (e.g., steady state) may be in a corresponding segment (e.g., 0 seconds to 10 seconds has less than a threshold change of slope and is in a corresponding segment). A portion of the historical trace data that is between two segments of steady state may be in a corresponding segment (e.g., 0 seconds to 10 seconds is steady state and is a first segment, 15 seconds to 30 seconds is steady state and is a third segment, 10 to 15 seconds is not steady state (e.g., has a change of slope that is greater than the threshold change in slope) and is a second segment). The processing logic may segment the historical trace data without tuning the historical trace data.

At block 424, the processing logic extracts patterns from the historical trace data. Patterns may include one or more of slope (e.g., ramp, flat), width, height, peak, etc. of the historical trace data.

At block 424, the processing logic may determine (e.g., extract), based on the patterns, features in the historical trace data. For example, the processing logic may determine features based on the extracted patterns and subject matter expert (SME) knowledge (e.g., based on user input indicating one or more features). The processing logic may extract feature parameters (e.g., characterize distributions) from the historical trace data. For example, the processing logic may determine specific feature parameters such as slope, length, width, height, standard deviation, etc. The feature parameters may also be based on SME knowledge. The processing logic may select feature parameters based on one or more criteria. For example, the criteria may include one or more of area under the curve (AUC), receiver operating characteristic (ROC), F1 score (e.g., measure of model's accuracy that combines precision and recall), Fisher score, SVM weights, or the like. The processing logic may label the selected feature parameters (e.g., as labeled feature parameters). If a feature parameter is dominant (e.g., has more than 50% influence, is a single dominant feature parameter, etc.), univariate limit optimization may be used (e.g., univariate limit analysis). If any feature is not dominant (e.g., a plurality of dominant feature parameters), a multivariate model (e.g., trained machine learning model, SVM model, multivariate limit analysis, etc.) may be built with adaptation mechanism (e.g., block 450 and/or 452 of FIG. 4C).

In some embodiments, the processing logic injects fault traces in the historical trace data (e.g., baseline trace), combines the baseline and fault traces, parameterizes the combined traces, adjusts parameters, and generates combined traces (e.g., combined baseline and fault traces) to study performance of the feature extraction and limit generation.

In some embodiments, the processing logic receives data (e.g., including one or more of normal trace data, abnormal trace data, abnormal feature parameters, or other parameters by subject matter expertise), simulates a trace using the data, generates configurable traces including normal trace data and abnormal trace data, and uses the configurable traces for modeling and FDC limit optimization. The processing logic may perform one or more of univariate limit optimization, decision boundary visualization, or multivariate limit optimization.

Referring to FIG. 4C, at block 440, the processing logic receives current trace data including current sensor values associated with producing, by manufacturing equipment, second products. The current trace data of block 440 may be received after the historical trace data of block 402. Production of the second products of block 440 may begin after production of first products of block 402 (e.g., after first products have been produced, after historical product data of the first products has been received).

At block 442, the processing logic processes the current trace data to identify features of the current trace data. In some embodiments, processing of the current trace data may include one or more acts of method 400B of FIG. 4B. In some embodiments, features identified in block 442 are the same types of features used to train the machine learning model in block 408 of FIG. 4A. In some embodiments, block 442 includes the processing logic receiving an indication of the features used to train the machine learning model and the processing logic identifying the features of the current trace data based on the indication. In some embodiments, the processing logic determines, for the features, parameter data. Parameter data can include one or more of feature parameters, feature parameter distribution in space, feature parameter distribution in time, or frequency of feature occurrence in the current trace data. The parameter data may be provided as further input to the trained machine learning model in block 444.

At block 444, the processing logic provides the features (e.g., selected feature parameters of the features) as input to a trained machine learning model that uses a hyperplane limit for product classification. In some embodiments, the processing logic uses SME in addition to or instead of the trained machine learning model.

At block 446, the processing logic obtains, from the trained machine learning model, one or more outputs indicative of predictive data (e.g., indication of normal and abnormal products) associated with the hyperplane limit. The hyperplane limit may be the same hyperplane limit determined in method 400A during the training of the machine learning model. In some embodiments, the hyperplane limit is determined via method 400E of FIG. 4E. In some embodiments, the processing logic obtains the one or more outputs indicative of predictive data based on SME in addition to or instead of the trained machine learning model.

At block 448, the processing logic may process the predictive data and the hyperplane limit to determine: first products associated with the first product classification based on a subset of features; second products associated with second product classification based on the same subset of features; and third products associated with the first or second product classification based on an additional feature. The processing logic may determine an FDC limit based on the predictive data and hyperplane limit and predict, based on the FDC limit, one or more causes of classifications within the products (e.g., abnormal products of abnormal products of the second products) to perform a corrective action associated with the manufacturing equipment. In some embodiments, the classifications within the products may not completely separate the products (e.g., normal and abnormal products). The processing logic may create a hyperplane limit that provides partial separation of products according to an optimization function or other specification. In some embodiments, the optimization would be to minimize a weighted function of missed and false positives, where a positive is a prediction of an abnormal product.

The processing logic may use the predictive data to generate one or more plots including the FDC limit (e.g., see plots 600A-B of FIGS. 6A-B). The processing logic may generate a plot that has three regions: 1) abnormal region indicating abnormal products based on the displayed one or more variables; 2) normal region indicating normal products based on the displayed one or more variables; and 3) gray region indicating abnormal or normal product prediction but not just dependent on the displayed variables (e.g., based at least on one or more additional variables).

In some embodiments, the processing logic may predict, based on the predictive data, a first subset of the second products that are abnormal and a second subset of the second products that are normal. The processing logic may cause the first subset to be labeled as abnormal and the second subset to be labeled as normal.

In some embodiments, the processing logic generates a plot that defines a first region associated with a first product classification (e.g., normal wafers) being determined by corresponding values of a set of features (e.g., exclusively by a first feature and a second feature), a second region associated with a second product classification (e.g., abnormal wafers) being determined by corresponding values of the set of features, a third region associated with classification not being determined exclusively based on corresponding values of the set of features (e.g., the wafers are normal or abnormal based at least on one feature not within the set of features). The plot generated by the processing logic may further define a fourth region associated with a fourth product classification being determined by corresponding values of the set of features. For example, the first product classification may be normal wafers, the second product classification may be a first type of abnormal wafers (e.g., greater than a first threshold amount of defects, abnormal based on a first cause), and the fourth product classification may be a second type of abnormal wafers (e.g., greater than a second threshold amount of defects, abnormal based on a second cause, etc.). The third region (e.g., gray region) may include products that are in any classification (e.g., first product classification, second product classification, fourth product classification, etc.) due to a feature instead of or in addition to one or more of the features in the set of features, wherein the feature is not from within the set of features.

The corrective action associated with the manufacturing equipment may include one or more of causing a GUI to display an alert (e.g., via a client device 120 of FIG. 1, via the manufacturing equipment 124 of FIG. 1, via a user device of an administrator, etc.), updating manufacturing parameters associated with the manufacturing equipment, by interrupting operation of the manufacturing equipment, by causing one or more components of the manufacturing equipment to be replaced, or the like.

At block 450, the processing logic adapts the FDC limit based on change in product quality over time (e.g., performs model adaptation due to drift). In some embodiments, the processing logic receives current product data. The processing logic may perform incremental training of the machine learning model to adaptively adjust the FDC limit. In some embodiments, the processing logic re-trains the trained machine learning model based on the current product data and the features associated with the current trace data. In some embodiments, the processing logic trains a new machine learning model (e.g., and discards the trained machine learning model from block 408) based on the current product data and the current trace data. In some embodiments, specified parameters of the trained machine learning model (e.g., offset) are allowed to adjust (e.g., according to an algorithm, such as weighted averaging of data) so as to adapt the FDC limit. The determination of whether or not adaptation of limits should occur and the type and level of adaptation that should be accepted could be provided by a one or more of (e.g., a combination of two or more of) of SME, historical data analysis, algorithmic computation, or the like. For example, SME may be used to determine which change in product quality over time (e.g., drift) is faulty vs. normal.

The current product data may be an indication of whether products corresponding to the current trace data are abnormal or normal. In some embodiments, the current product data is user indication of normal products and/or abnormal products (e.g., 97% yield associated with current trace data compared to 98% yield associated with historical trace data). In some embodiments, the current product data is based on current metrology data (e.g., indicating which products are abnormal and which are abnormal). In some embodiments, the current product data is based on current predictive percentage. For example, the historical predictive percentage may be that 2% of the products are abnormal for runs 1-20 and the current predictive percentage may be that 3% of the products are abnormal for runs 21-40. In another example, the historical predictive percentage may use three-sigma to determine abnormal products for runs 1-20 and the current predictive percentage may use four-sigma to determine abnormal products for runs 21-40. Over time, the manufacturing equipment may age or drift, and block 420 may adapt the FDC limit to accommodate the aging or drifting. In some embodiments, there may be an acceptable degree or amount of drift. Responsive to the drift being greater than an acceptable degree or amount of drift, a fault may be detected.

In some embodiments, at block 450, the processing logic may train the machine learning model based on the current features and the current product data to generate a hyperplane limit. The processing logic may generate a FDC limit based on the hyperplane limit by finding a minimal change to be used from existing FDC limits (e.g., associated with historical trace data) to arrive at the new FDC limits (e.g., associated with current trace data), while maintaining separation between normal products and abnormal products. In some embodiments, the separation may not be complete separation (e.g., may not be 100% separation). In a noisy system, there may be 2% error in predicting and the FDC limit may be adjusted so that most of the errors are missed predictions vs. false predictions (e.g., missed positives vs. false positives).

In some embodiments, at block 450, the processing logic may identify process drift (e.g., associated with manufacturing parameters of manufacturing equipment over time) in the current trace data, determine whether the process drift contributes to product abnormality, and cause a corrective action responsive to determining the process drift contributes to product abnormality or adapting the FDC limit based on the process drift responsive to determining the process drift does not contribute to product abnormality.

In some embodiments, at block 450, processing logic may use incremental modeling with exponentially weighted moving average (EWMA) (e.g., SVM with a linear kernel) to provide visualization of the hyperplane limit as a FDC limit.

At block 452, the processing logic adjusts the FDC limit based on one or more of preventative maintenance, set point change, or equipment constant change (e.g., performs model adaptation due to preventative maintenance, set point change, or equipment constant change). In some embodiments, the processing logic may receive a notification (e.g., indication, trigger) to adjust the FDC limit (e.g., to a new target value) based on changes (e.g., PM, set point, or EC changes) and may adjust the FDC limits responsive to receiving the notification. For example, the processing logic may receive an indication that the set point of temperature has increased by 2 degrees Fahrenheit (° F.), the processing logic may assume the change in set point was to improve the yield of the products, and the processing logic may adjust the FDC limit by 2° F.

In some embodiments, at block 452, processing logic may use sliding modeling with exponentially weighted moving average (EWMA) (e.g., SVM with a linear kernel) to provide visualization of the hyperplane limit as a FDC limit.

In some embodiments, the processing logic may receive an indication of preventative maintenance (e.g., from a preventative maintenance counter, user input, etc.). The preventative maintenance may move the manufacturing equipment into a new operating regime (e.g., less power needed) and may invalidate the FDC limit. Upon receiving the indication of preventative maintenance, the processing logic may perform a flat FDC limit adjustment or may move an average FDC limit adjustment (e.g., offset the FDC limit based on the indication of preventative maintenance). In some embodiments, the set point change and/or equipment constant change may tune the tool performance, causing an FDC limit violation. The processing logic may receive an indication of set point change (e.g., from a set point sensor) or an equipment constant change (e.g., from an equipment constant sensor). Responsive to receiving the indication, the processing logic may perform a FDC limit adjustment based on the indication.

Figure 4D:
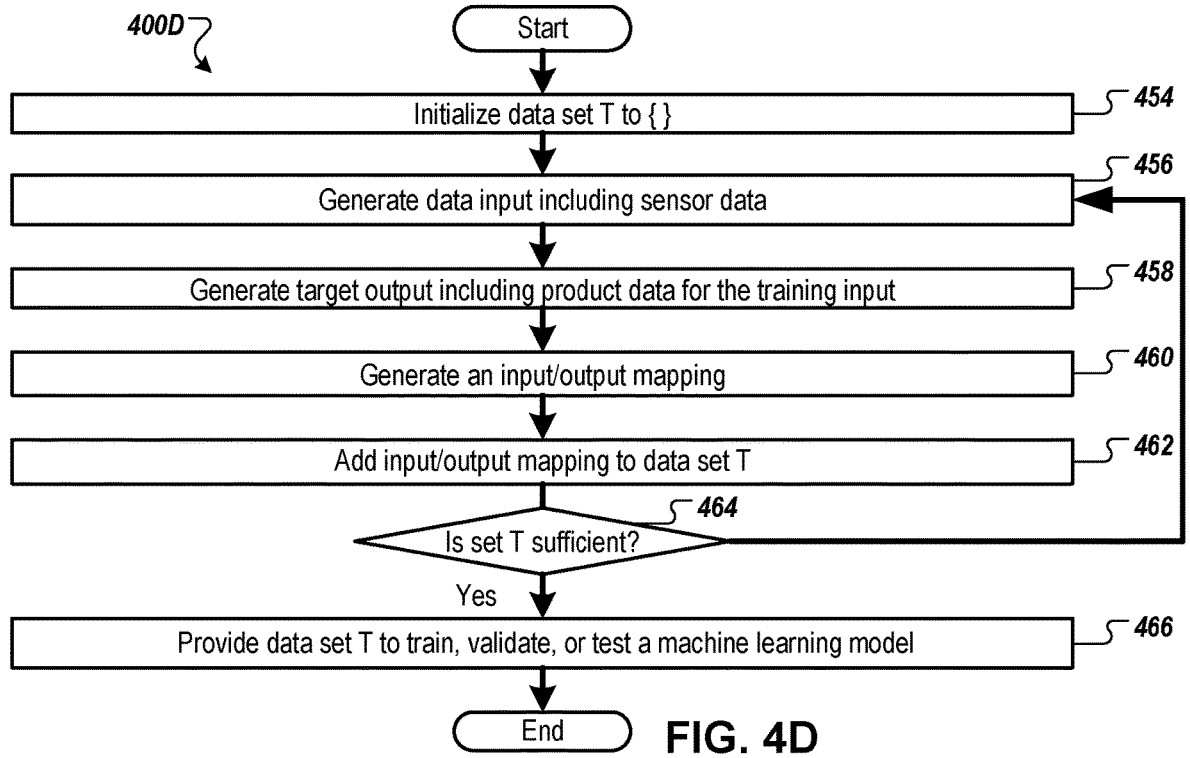
Figure 4E:
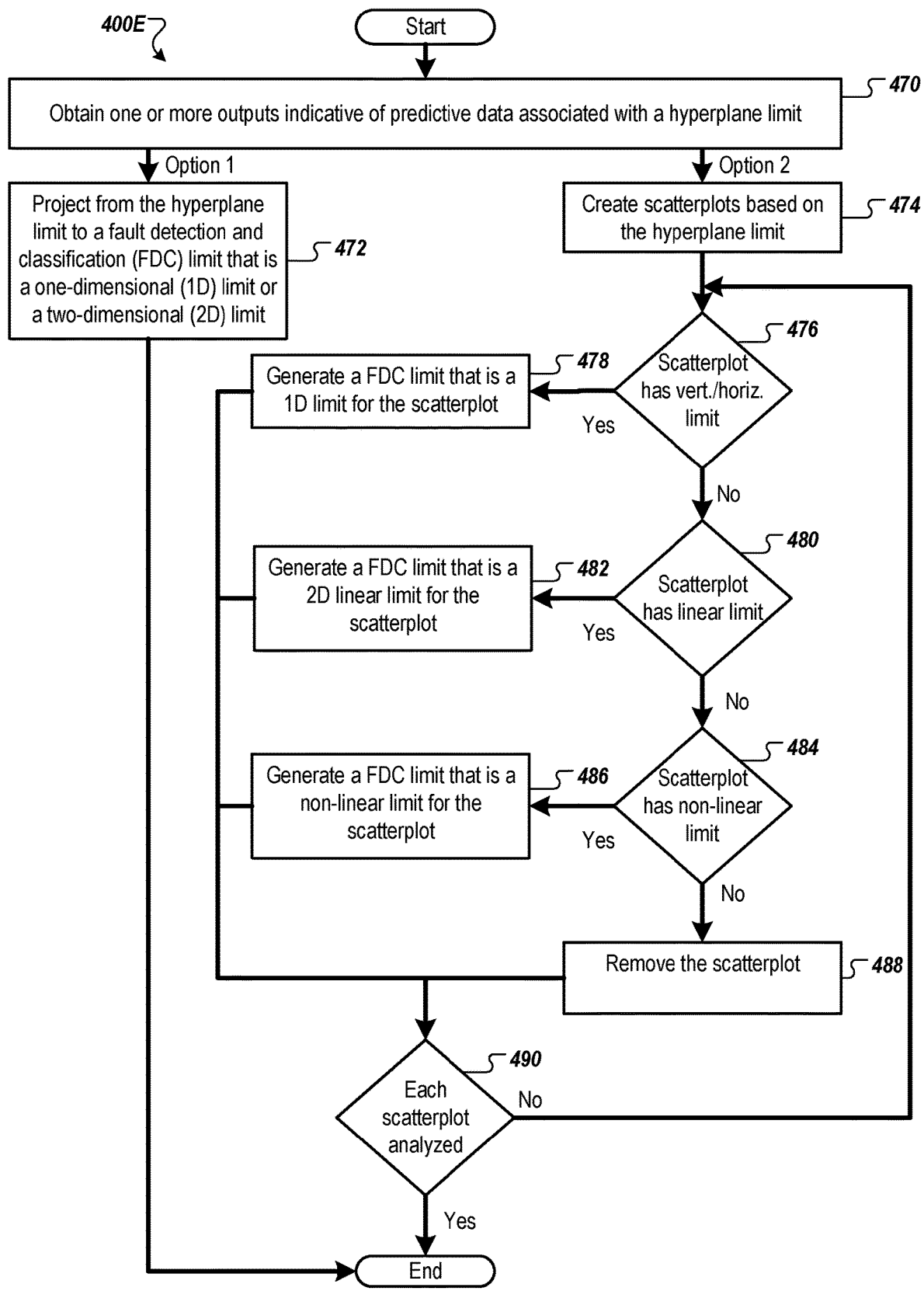

In some embodiments, obtaining the FDC limit of block 446 may be performed by method 400E of FIG. 4E.

FIG. 4D is a flow diagram of a method 400D for generating a data set for a machine learning model for generating predictive data (e.g., predictive data 169 of FIG. 1), according to certain embodiments.

Referring to FIG. 4D, in some embodiments, at block 454 the processing logic implementing method 400E initializes a training set T to an empty set.

At block 456, processing logic generates first data input (e.g., first training input, first validating input) that includes sensor data (e.g., sensor data 142 of FIG. 1, sensor data 242 of FIG. 2). In some embodiments, the first data input may include a first set of features (e.g., historical features 148 of FIG. 1) for types of sensor data and a second data input may include a second set of features for types of sensor data (e.g., as described with respect to FIG. 2).

At block 458, processing logic generates a first target output for one or more of the data inputs (e.g., first data input). The first target output may be corresponding product data (e.g., historical product data 158 of FIG. 1, historical product data 258 of FIG. 2, historical product data 358 of FIG. 3).

At block 460, processing logic optionally generates mapping data that is indicative of an input/output mapping. The input/output mapping (or mapping data) may refer to the data input (e.g., one or more of the data inputs described herein), the target output for the data input (e.g., where the target output identifies historical product data 158), and an association between the data input(s) and the target output.

At block 462, processing logic adds the mapping data generated at block 460 to data set T.

At block 464, processing logic branches based on whether data set T is sufficient for at least one of training, validating, and/or testing machine learning model 190. If so, execution proceeds to block 466, otherwise, execution continues back at block 458. It should be noted that in some embodiments, the sufficiency of data set T may be determined based simply on the number of input/output mappings in the data set, while in some other implementations, the sufficiency of data set T may be determined based on one or more other criteria (e.g., a measure of diversity of the data examples, accuracy, etc.) in addition to, or instead of, the number of input/output mappings.

At block 466, processing logic provides data set T (e.g., to server machine 180) to train, validate, and/or test machine learning model 190. In some embodiments, data set T is a training set and is provided to training engine 182 of server machine 180 to perform the training. In some embodiments, data set T is a validation set and is provided to validation engine 184 of server machine 180 to perform the validating. In some embodiments, data set T is a testing set and is provided to testing engine 186 of server machine 180 to perform the testing. In the case of a neural network, for example, input values of a given input/output mapping (e.g., numerical values associated with data inputs 210) are input to the neural network, and output values (e.g., numerical values associated with target outputs 220) of the input/output mapping are stored in the output nodes of the neural network. The connection weights in the neural network are then adjusted in accordance with a learning algorithm (e.g., back propagation, etc.), and the procedure is repeated for the other input/output mappings in data set T. After block 466, machine learning model (e.g., machine learning model 190) can be at least one of trained using training engine 182 of server machine 180, validated using validating engine 184 of server machine 180, or tested using testing engine 186 of server machine 180. The trained machine learning model may be implemented by predictive component 114 (of predictive server 112) to generate predictive data 169 (e.g., including one or more FDC limits) for performing corrective action associated with the manufacturing equipment 124.

Referring to block FIG. 4E, at block 470, the processing logic obtains one or more outputs indicative of predictive data associated with a hyperplane limit. The hyperplane limit may be greater than two dimensions. The hyperplane limit may separate classifications of products (e.g., separate normal products from abnormal products). In some embodiments, there is a margin (e.g., defined by support vectors generated by the SVM) between the hyperplane limit and the closest products.

In some embodiments, the hyperplane limit may be generated by training a machine learning model responsive to providing the features generated based on the historical trace data as input and historical product data as target output to the trained machine learning model. The quantity of features may be "n" and the number of dimensions of the hyperplane limit may be "n–1." For example, if there the current trace data is sensor values from 10 sensors and there are 100 features derived from the sensor values from 10 sensors, then the hyperplane limit would be in 99 dimensions. To generate a FDC limit from the hyperplane limit, there may be two options. Option 1 may be shown in block 472 and option 2 may be shown in blocks 474-490.

At block 472, the processing logic projects from the hyperplane limit to a FDC limit that is a 1D limit or a 2D limit. For example, the hyperplane may only be affected by one or two features, so the hyperplane may be projected onto a 1D (e.g., one axis is the feature and one axis is time or run) or 2D (e.g., one axis is one feature and another axis is another feature).

At block 474, the processing logic creates scatterplots based on the hyperplane limit for each of the features generated from the current trace data. In some embodiments, the processing logic creates a scatterplot matrix (e.g., pairwise scatterplots, pairwise sensor-statistics scatterplots) based on the features generated from the current trace data. For a set of data variables (e.g., dimensions $X_1, X_2, \ldots, X_k$, features generated from the current trace data), a scatterplot matrix shows the pairwise scatterplots of the variables on a single view with the multiple scatterplots in matrix format. For "n" variables (e.g., features), the scatterplot matrix may contain "n" rows and "n" columns. A plot located on the intersection of the i-th row and the j-th column is a plot of variables (e.g., features) $X_i$ versus $X_j$. Each row and column may be one dimension and each cell plots a scatterplot of two dimensions. Blocks 476-488 may be performed for each scatterplot (e.g., each pairwise sensor-statistics scatterplot) generated in block 474 (e.g., each scatterplot of the scatterplot matrix). The scatterplots may show sensor interactions (e.g., and feature interaction).

At block 476, the processing logic determines if a scatterplot has a vertical or horizontal limit that separates the abnormal products from the normal products. In some embodiments, the vertical or horizontal limit separates all abnormal products from all normal products. In some embodiments, the vertical or horizontal limit separates a majority of the abnormal from a majority of the normal products given an optimization function or other guidance. Responsive to determining there is a vertical or horizontal limit, flow continues to block 478. Responsive to determining there is not a vertical or horizontal limit, flow continues to block 480.

At block 478, the processing logic generates the FDC limit that is a 1D limit based on the scatterplot. The FDC limit of block 478 may be a univariate limit (e.g., only one feature determines if the product is normal or abnormal). In some embodiments, the FDC limit may separate an abnormal region and normal region on a plot. The FDC limit may be a gray region that indicates that at least one additional feature causes the product in the gray region to be normal or abnormal (e.g., see FIGS. 6B-C).

At block 480, the processing logic determines whether the scatterplot has a linear (e.g., slanted) limit that separates the abnormal products from the normal products. Responsive to determining there is a linear limit, flow continues to block 482. Responsive to determining there is not a linear limit, flow continues to block 484.

At block 482, the processing logic generates the FDC limit that is a 2D linear limit based on the scatterplot. The FDC limit of block 482 may be a two-variable limit (e.g., two features determine whether the product is normal or abnormal). In some embodiments, the FDC limit may separate an abnormal region and normal region on a plot. The FDC limit may be a gray region that indicates that at least one additional feature causes the product in the gray region to be normal or abnormal.

At block 484, the processing logic determines whether the scatterplot has a non-linear limit that separates the abnormal products from the normal products. Responsive to determining there is a non-linear limit, flow continues to block 486. Responsive to determining there is not a non-linear limit, flow continues to block 488.

At block 486, the processing logic generates (e.g., using a SVM RBF kernel) the FDC limit that is a non-linear limit.

For example, the FDC limit may be a polynomial function that separates abnormal products from normal products in the scatterplot. In some embodiments, the FDC limit may separate an abnormal region and normal region on a plot. The FDC limit may be a gray region that indicates that at least one additional feature causes the product in the gray region to be normal or abnormal.

At block 488, the processing logic removes the scatterplot that does not have a FDC limit. The processing logic may not monitor or analyze the features that correspond to the removed scatterplot.

At block 490, the processing logic determines whether each scatterplot created at block 474 has been analyzed (e.g., FDC limit generated or scatterplot removed). Responsive to each scatterplot not having been analyzed, flow returns to block 466 to analyze a different scatterplot. Once all of the scatterplots have been analyzed, flow ends.

In some embodiments, a corresponding FDC limit is found for more than one scatterplot (e.g., more than one pair of features may cause a product to be abnormal). In some embodiments the one or more FDC limits are generated based on the historical trace data (e.g., as a part of method 400A) and the one or more FDC limits are applied during the using of the trained machine learning model (e.g., as part of method 400C). In some embodiments, the machine learning model is trained as part of method 400A and then the one or more FDC limits are generated during the using of the trained machine learning model as part of method 400C.

In some embodiments, each FDC limit is a single line (e.g., horizontal, vertical, linear, non-linear) that separates abnormal products from normal products. In some embodiments, each FDC limit includes multiple lines (see FIGS. 6A-B), where abnormal products are on one side of the FDC limit (e.g., only affected by the features shown on the plot), normal products are on the other side of the FDC limit (e.g., only affected by the features shown on the plot), and products shown within the multiple lines of the FDC limit may be affected by features not shown in the plot (e.g., features instead of or in addition to the features shown on the two axes).

In some embodiments, the processing logic may provide a visual representation of the scatterplots that have a FDC limit to illustrate the one or more causes (e.g., features) of the abnormal products. An example of a scatterplot with a linear FDC limit may be illustrated by plot 600A of FIG. 6A and an example of a scatterplot with a non-linear FDC limit may be illustrated by plot 600B of FIG. 6B. When multiple scatterplots are generated, each scatterplot may have different features in the axes of the scatterplot.

Figure 5B:
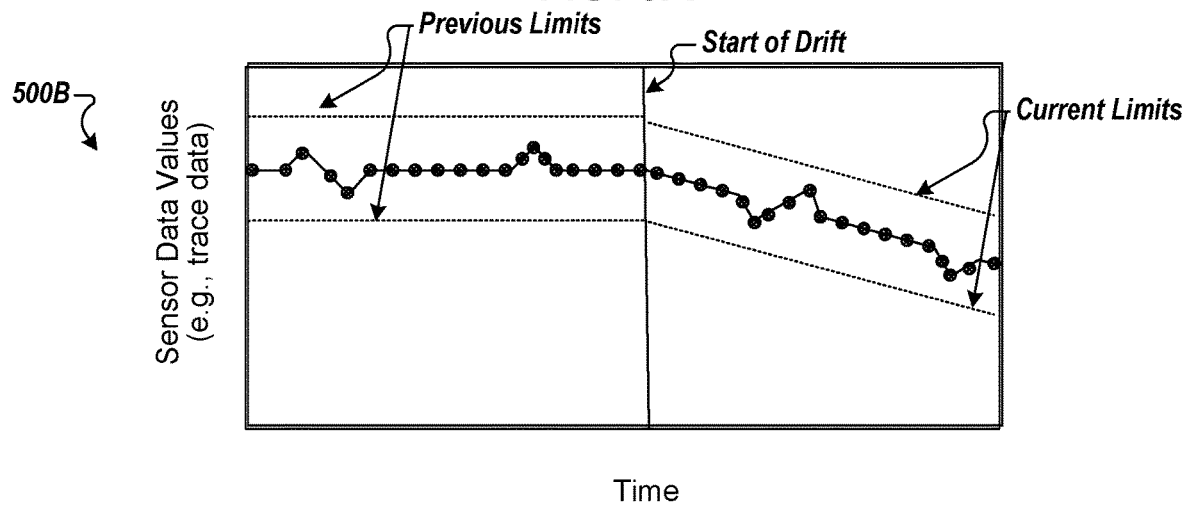
Figure 5C:
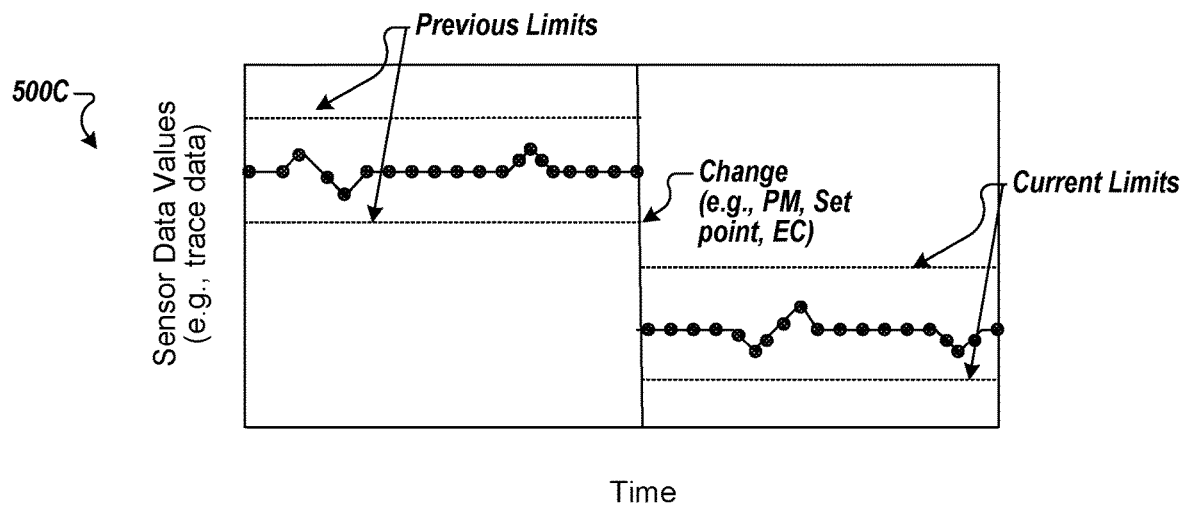

FIGS. 5A-C illustrate plots 500A-C (hereinafter "plot 500") including sensor data values over time (e.g., trace data), according to certain embodiments.

FIG. 5A illustrates recipe steps of a recipe over time. The sensor data values may form one or more feature patterns, such as a spike, a slope, a flat region, etc. The sensor data values and/or feature patterns may be used to generate a hyperplane limit (e.g., FIG. 4A) and/or a plot of the FDC limit and regions (e.g., normal region, abnormal region, gray region) (e.g., FIG. 4C).

FIG. 5B illustrates drift in sensor data values. In some embodiments, drift may cause abnormal products. In some embodiments, the drift may not cause abnormal products. The adaptive component (e.g., adaptive component 116) may determine (e.g., based on knowledge base 118) whether the drift causes abnormal products and how to adjust the FDC limit (and/or hyperplane limit). The adaptive component may adjust the FDC limit based on drift without the model being re-trained.

FIG. 5C illustrates a change (e.g., preventative maintenance, set point change, equipment constant change). The adaptive component may receive an indication of the change and may adjust the FDC limit (and/or hyperplane limit). The adaptive component may adjust the FDC based on a change without the model being re-trained.

FIGS. 6A-E illustrate plots 600A-E (hereinafter "plot 600" including FDC limits 610A-B (hereinafter "FDC limit 610"), according to certain embodiments. The plots 600 may be generated from a machine learning model.

In some embodiments, historical product data and historical features associated with historical trace data are used to train a machine learning model. The trained machine learning model may use a hyperplane limit for product classification (e.g., to separate the abnormal and normal products). One or more FDC limits 610 may be derived from the hyperplane limit (e.g., see FIG. 4E). The plots 600 may be generated (e.g., based on the trained machine learning model) to identify the causes of the abnormal products associated with trace data (e.g., the historical trace data). The hyperplane limit may be used to generate one or more FDC limits 610 to predict causes of abnormal products in current trace data. For example, the hyperplane limit generated for historical trace data may be the same hyperplane limit used to generate FDC limits 610 for current trace data.

In some embodiments, a trained machine learning model is generated based on historical features and historical product data. The current features associated with current trace data is input into the trained machine learning model and the trained machine learning model may provide output indicative of predictive data. One or more FDCs may be generated based on the output (e.g., the predictive data). The plots 600 may be generated from the output to predict the causes of (e.g., sets of features associated with) the abnormal products (e.g., that are being produced or that are to be produced) associated with the current trace data.

In some embodiments, the FDC limit (e.g., on a plot 600) is a single line (e.g., high certainty a product is abnormal or normal based on the two features). In some embodiments, the FDC limit 610 includes multiple lines (e.g., high certainty a product is abnormal or normal based on the two features on either side of the FDC limit 610 and lower certainty a product is abnormal or normal based on the two features within the multiple lines). The area within the multiple lines may be referred to as a gray area.

The plots 600 may include visual representations of the FDC limit 610, the abnormal products, and normal products to identify one or more causes (e.g., feature 1, feature 2) of the abnormal products and the normal products. The plot 600A may include a first axis (e.g., x-axis) corresponding to a first feature (e.g., feature 1) and a second axis (e.g., y-axis) corresponding to a second feature (e.g., feature 2). The lines on the plot may represent the FDC limit 610. A first set of indicators (e.g., empty circles) on a first side (e.g., left side) of the lines represent abnormal products caused by features 1-2. A second set of indicators (e.g., empty circles) within the plurality of lines represent abnormal products caused by one or more additional features (e.g., in addition to or instead of one or both of features 1-2). A third set of indicators (e.g., shaded circles) on a second side (e.g., right side) of the lines represent normal products caused by features 1-2. A fourth set of indicators (e.g., shaded circles) within the plurality of lines represent abnormal products caused by one or more additional features (e.g., in addition to or instead of one or both of features 1-2).

The FDC limit 610A of FIG. 6A may be a limit that separates an abnormal region from a normal region and does not have a gray region (e.g., all products are normal or abnormal based on features 1-2).

The FDC limit 610B of FIG. 6B may be a limit that separates an abnormal region from a normal region and creates a gray region. The products in the gray region may be normal or abnormal based on at least one additional feature other than and/or in addition to one or more of features 1-2.

The FDC limit 610C of FIG. 6C may be a limit that separates an abnormal region from a normal region and creates a gray region. The FDC limit 610C of FIG. 6C may have been adjusted (e.g., by adaptive component 116) based on one or more of drift, change, etc. compared to FDC limit 610B.

Figure 6D:
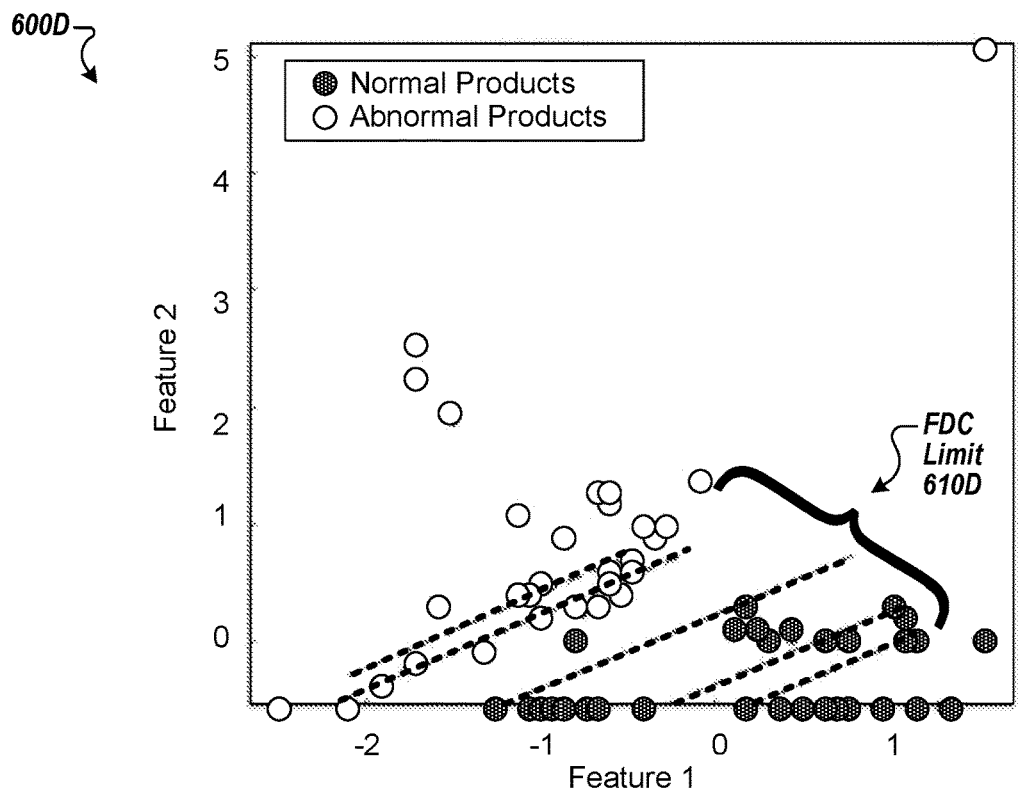
Figure 6E:
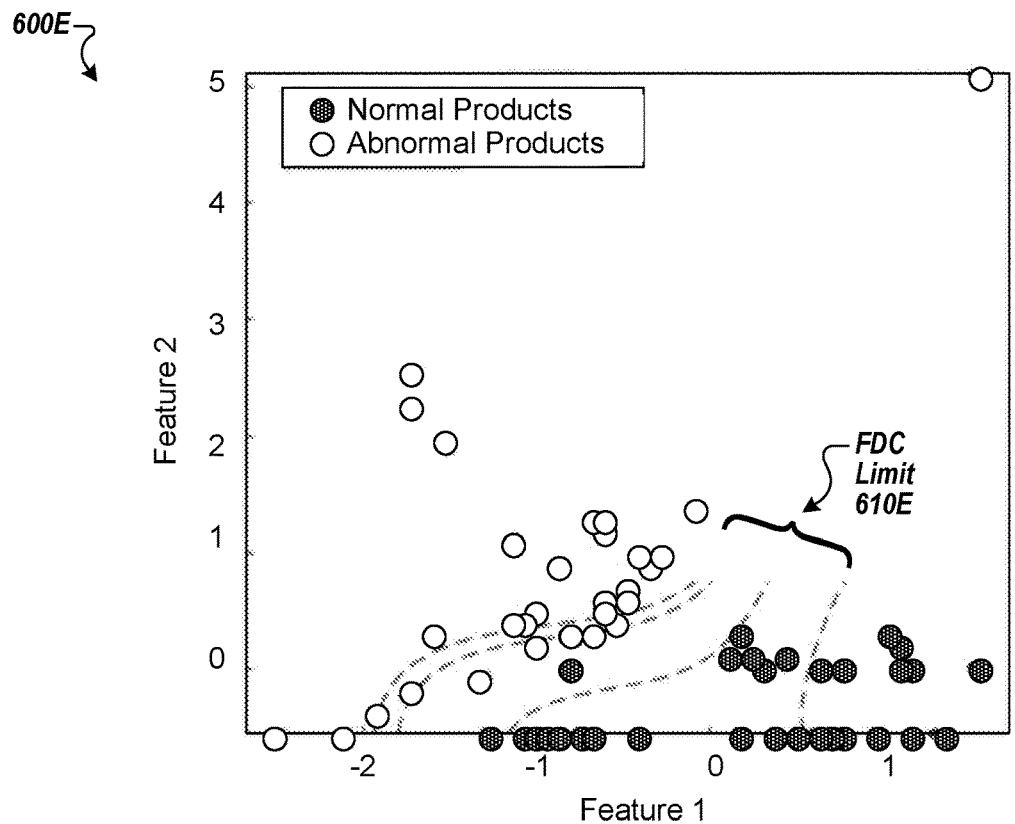

The FDC limit 610D of FIG. 6D may be a linear limit (e.g., each of the lines is slanted and not curved). The FDC limit 610E on FIG. 6E may be a non-linear limit (e.g., each of the lines is curved, each of the lines is a corresponding polynomial). The plot 600E may have less indicators of normal and abnormal products that are within the lines (e.g., less indicators in the gray region).

Plots 600A-E may be automatically generated (e.g., using a trained machine learning model) and may have absolute univariate analysis (UVA) or multivariate analysis (MVA) limits that result in substantially no false positives (e.g., or no false positives). The lines of the FDC limit define a gray area where classification may be related to other features (e.g., variables). The processing logic may automatically generate FDC limits and may automatically adjust the FDC limits over time to track processes (e.g., semiconductor manufacturing processes).

The gray region may change over time. For example, the gray region may change based on re-training of the model (e.g., receiving more data) and/or model adaptation (e.g., based on drift, changes, etc.).

Figure 7:
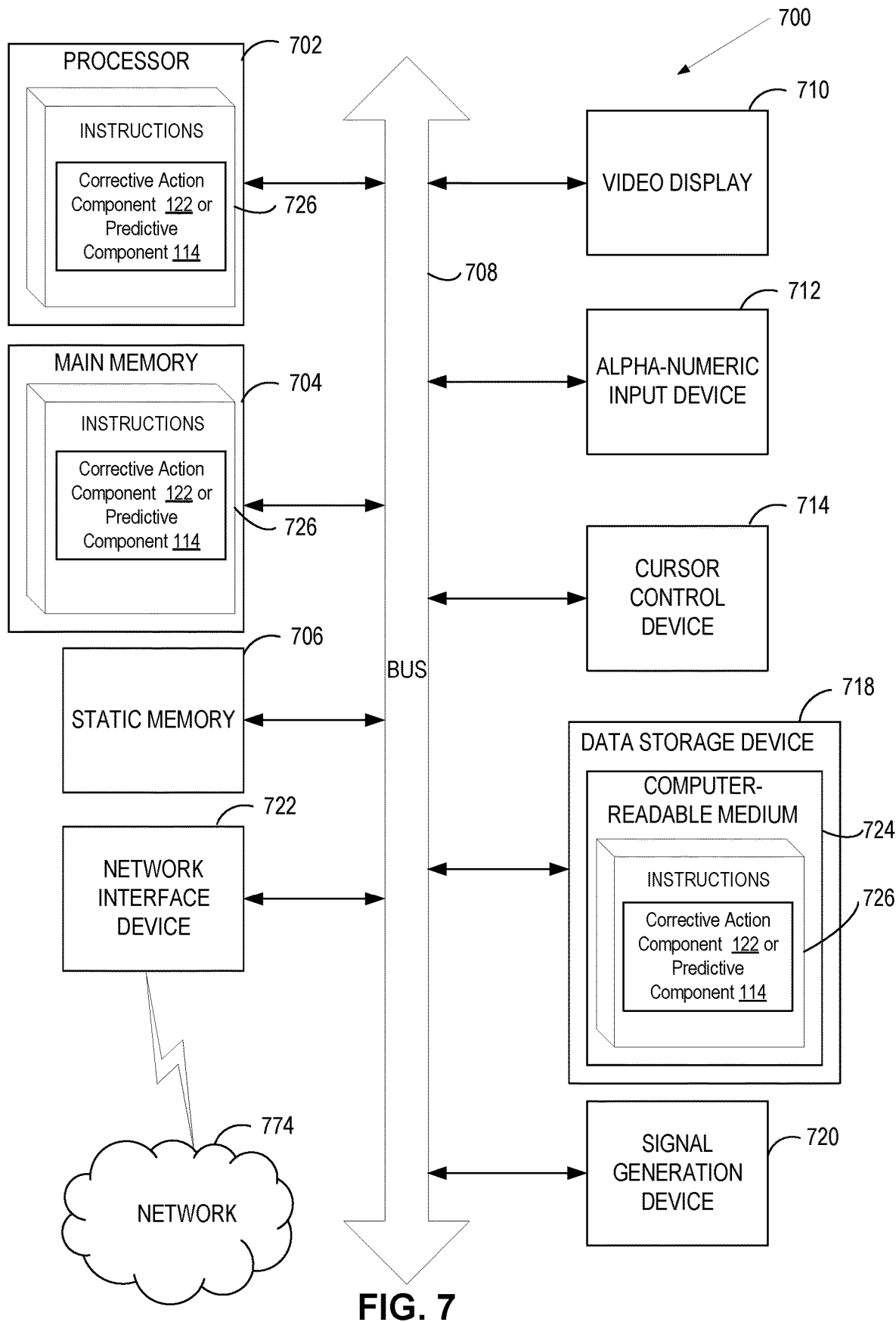
FIG. 7 is a block diagram illustrating a computer system, according to certain embodiments.

FIG. 7 is a block diagram illustrating a computer system 700, according to certain embodiments. In some embodiments, computer system 700 may be connected (e.g., via a network, such as a Local Area Network (LAN), an intranet, an extranet, or the Internet) to other computer systems. Computer system 700 may operate in the capacity of a server or a client computer in a client-server environment, or as a peer computer in a peer-to-peer or distributed network environment. Computer system 700 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 700 may include a processing device 702, a volatile memory 704 (e.g., random access memory (RAM)), a non-volatile memory 706 (e.g., read-only memory (ROM) or electrically-erasable programmable ROM (EEPROM)), and a data storage device 716, which may communicate with each other via a bus 708.

Processing device 702 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 700 may further include a network interface device 722. Computer system 700 also may include a video display unit 710 (e.g., an LCD), an alpha-numeric input device 712 (e.g., a keyboard), a cursor control device 714 (e.g., a mouse), and a signal generation device 720.

In some implementations, data storage device 716 may include a non-transitory computer-readable storage medium 724 on which may store instructions 726 encoding any one or more of the methods or functions described herein, including instructions encoding components of FIG. 1 (e.g., corrective action component 122, visualization component 123, predictive component 114, adaptive component 116, etc.) and for implementing methods described herein.

Instructions 726 may also reside, completely or partially, within volatile memory 704 and/or within processing device 702 during execution thereof by computer system 700, hence, volatile memory 704 and processing device 702 may also constitute machine-readable storage media.

While computer-readable storage medium 724 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "receiving," "processing," "providing," "obtaining," "predicting," "preprocessing," "segmenting," "extracting," "determining," "generating," "projecting," "creating," "adapting," "adjusting," "causing," "updating," "training," "identifying," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may include a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods described herein and/or each of their individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
    receiving, from a plurality of sensors, current trace data comprising current sensor values associated with manufacturing parameters used during producing, by manufacturing equipment, a plurality of wafers;
    processing the current trace data to identify a plurality of features of the current trace data associated with the manufacturing parameters used during the producing of the plurality of wafers via the manufacturing equipment;
    providing the plurality of features of the current trace data as input to a trained machine learning model that uses a hyperplane limit associated with classifying each of the plurality of wafers as being substantially normal or having a type of abnormality;
    obtaining, from the trained machine learning model, one or more outputs indicative of predictive data associated with the hyperplane limit; and
    processing the predictive data and the hyperplane limit to determine:
        one or more first wafers associated with a first wafer classification based exclusively on a subset of the plurality of features;
        one or more second wafers associated with a second wafer classification based exclusively on the subset of the plurality of features; and
        one or more third wafers associated with the first wafer classification or the second wafer classification based on an additional feature not within the subset of the plurality of features, wherein:
            a corrective action associated with the manufacturing equipment is to be performed based on the processing of the predictive data and the hyperplane limit; and
            the corrective action comprises one or more of: causing a graphical user interface to display an alert; updating the manufacturing parameters associated with the manufacturing equipment interrupting operation of the manufacturing equipment; causing maintenance to be performed on the manufacturing equipment; or causing one or more components of the manufacturing equipment to be replaced.

2. The method of claim 1, wherein the processing of the current trace data comprises:
    preprocessing the current trace data to at least one of remove outliers or align the current trace data;
    segmenting, using a sliding window, the current trace data into segmented trace data;
    extracting patterns from the segmented trace data, wherein the patterns comprise one or more of a ramp or a flat; and
    determining, based on the patterns, the plurality of features of the current trace data.

3. The method of claim 1 further comprising:
    determining, for the plurality of features, parameter data comprising one or more of feature parameters, feature parameter distribution in space, feature parameter distribution in time, or frequency of feature occurrence in the current trace data; and
    providing the parameter data as further input to the trained machine learning model.

4. The method of claim 1, wherein the hyperplane limit has greater than two dimensions, wherein the method further comprises:
    generating, based on the predictive data and the hyperplane limit, a fault detection and classification (FDC) limit; and
    generating a plot of the FDC limit to provide a visual representation of the one or more first wafers, the one or more second wafers, and the one or more third wafers relative to the FDC limit, wherein the FDC limit is a one-dimensional (1D) limit, a two-dimensional (2D) limit, or a greater than 2D limit.

5. The method of claim 4, wherein the generating of the FDC limit comprises one or more of:
    projecting from the hyperplane limit to the FDC limit; or
    creating a plurality of scatterplots based on the hyperplane limit and generating the FDC limit for a first scatterplot of the plurality of scatterplots.

6. The method of claim 4, wherein:
    the plot has a first axis corresponding to a first feature of the subset of the plurality of features and a second axis corresponding to a second feature of the subset of the plurality of features;
    a plurality of lines on the plot represent the FDC limit; and
    a plurality of regions comprising:
        a first region on a first side of the plurality of lines, wherein the first region is associated with the first wafer classification being determined by corresponding values of the first feature and the second feature;
        a second region on a second side of the plurality of lines, wherein the second region is associated with the second wafer classification being determined by corresponding values of the first feature and the second feature; and
        a third region within the plurality of lines, wherein the third region is associated with classification not being determined exclusively based on corresponding values of the first feature and the second feature.

7. The method of claim 6, wherein the plurality of regions comprises a fourth region, wherein the fourth region is associated with a third wafer classification being determined by the corresponding values of the first feature and the second feature.

8. The method of claim 6 further comprising:
determining a change in wafer quality associated with the manufacturing equipment over time; and
adjusting the plurality of regions based on the change in wafer quality.

9. The method of claim 4 further comprising:
identifying process drift in the current trace data, wherein the process drift is associated with the manufacturing parameters of the manufacturing equipment over time;
determining whether the process drift contributes to wafer abnormality;
responsive to determining the process drift contributes to the wafer abnormality, causing the corrective action; and
responsive to determining the process drift does not contribute to wafer abnormality, adapting the FDC limit based on the process drift.

10. The method of claim 4 further comprising:
receiving an indication of one or more of preventative maintenance, set point change, or equipment constant change; and
adjusting the FDC limit based on the one or more of the preventative maintenance, the set point change, or the equipment constant change.

11. The method of claim 1, wherein the trained machine learning model is a support vector machine (SVM) that uses radial basis function (RBF).

12. A method comprising:
receiving, from a plurality of sensors, historical trace data comprising historical sensor values associated with manufacturing parameters used during producing, by manufacturing equipment, a plurality of wafers;
processing the historical trace data to identify a plurality of features of the historical trace data associated with the manufacturing parameters used during the producing of the plurality of wafers via the manufacturing equipment;
receiving wafer data corresponding to the plurality of wafers; and
training a machine learning model using training data including the plurality of features of the historical trace data and the wafer data to generate a trained machine learning model that uses a hyperplane limit associated with classifying each of the plurality of wafers as being substantially normal or having a type of abnormality, the trained machine learning model being capable of generating one or more outputs indicative of predictive data associated with the hyperplane limit, wherein:
the predictive data and the hyperplane limit are indicative of:
one or more first wafers associated with a first wafer classification based exclusively on a subset of the plurality of features;
one or more second wafers associated with a second wafer classification based exclusively on the subset of the plurality of features; and
one or more third wafers associated with the first wafer classification or the second wafer classification based on an additional feature not within the subset of the plurality of features;
a corrective action associated with the manufacturing equipment is to be performed based on the predictive data and the hyperplane limit; and
the corrective action comprises one or more of: causing a graphical user interface to display an alert; updating the manufacturing parameters associated with the manufacturing equipment interrupting operation of the manufacturing equipment; causing maintenance to be performed on the manufacturing equipment; or causing one or more components of the manufacturing equipment to be replaced.

13. The method of claim 12, wherein the processing of the historical trace data comprises:
preprocessing the historical trace data to at least one of remove outliers or align the historical trace data;
segmenting, using a sliding window, the historical trace data into segmented trace data;
extracting patterns from the segmented trace data, wherein the patterns comprise one or more of a ramp or a flat; and
determining, based on the patterns, the plurality of features of the historical trace data.

14. The method of claim 12, wherein:
responsive to a single dominant feature parameter of the plurality of features, the trained machine learning model is based on univariate limit analysis using the single dominant feature parameter; and
responsive to a plurality of dominant feature parameters of the plurality of features, the trained machine learning model is based on multivariate limit analysis using the plurality of dominant feature parameters.

15. The method of claim 12, wherein the receiving of the wafer data comprises:
receiving, from metrology equipment, metrology data associated with the plurality of wafers; and
identifying, based on the metrology data, a first subset of the plurality of wafers that correspond to a first classification and a second subset of the plurality of wafers that correspond to a second classification, wherein the wafer data is based on the first subset and the second subset.

16. The method of claim 12, wherein the receiving of the wafer data comprises:
receiving user input associated with a predicted percentage of the plurality of wafers that are abnormal; and
determining, based on user input, one or more of a first amount of the plurality of wafers that are abnormal or a second amount of the plurality of wafers that are normal,
wherein the wafer data is based on the one or more of the first amount or the second amount.

17. A system comprising:
a memory; and
a processing device coupled to the memory, the processing device to:
receive, from a plurality of sensors, current trace data comprising current sensor values associated with manufacturing parameters used during producing, by manufacturing equipment, a plurality of wafers;
process the current trace data to identify a plurality of features of the current trace data associated with the manufacturing parameters used during the producing of the plurality of wafers via the manufacturing equipment;
provide the plurality of features of the current trace data as input to a trained machine learning model that uses a hyperplane limit associated with classifying each of the plurality of wafers as being substantially normal or having a type of abnormality;
obtain, from the trained machine learning model, one or more outputs indicative of predictive data associated with the hyperplane limit; and
process the predictive data and the hyperplane limit to determine:

one or more first wafers associated with a first wafer classification based exclusively on a subset of the plurality of features;

one or more second wafers associated with a second wafer classification based exclusively on the subset of the plurality of features; and one or more third wafers associated with the first wafer classification or the second wafer classification based on an additional feature not within the subset of the plurality of features, wherein:

a corrective action associated with the manufacturing equipment is to be performed based on the processing of the predictive data and the hyperplane limit; and the corrective action comprises one or more of: causing a graphical user interface to display an alert; updating the manufacturing parameters associated with the manufacturing equipment; interrupting operation of the manufacturing equipment; causing maintenance to be performed on the manufacturing equipment; or causing one or more components of the manufacturing equipment to be replaced.

18. The system of claim 17, wherein to process the current trace data, the processing device is to:

preprocess the current trace data to at least one of remove outliers or align the current trace data;

segment, using a sliding window, the current trace data into segmented trace data;

extract patterns from the segmented trace data, wherein the patterns comprise one or more of a ramp or a flat; and determine, based on the patterns, the plurality of features of the current trace data.

19. The system of claim 17, wherein the hyperplane limit has greater than two dimensions, wherein the processing device is further to;

generate, based on the predictive data and the hyperplane limit, a fault detection and classification (FDC) limit; and generate a plot of the FDC limit to provide a visual representation of the one or more causes of the one or more first wafers, the one or more second wafers, and the one or more third wafers relative to the FDC limit, wherein the FDC limit is a one-dimensional (1D) limit, a two-dimensional (2D) limit, or a greater than 2D limit.

* * * * *